United States Patent
Nakamura et al.

(10) Patent No.: US 7,421,527 B2
(45) Date of Patent: Sep. 2, 2008

(54) TRANSMISSION APPARATUS AND TRANSMISSION METHOD

(75) Inventors: Seiji Nakamura, Takatsuki (JP); Tatsuya Adachi, Neyagawa (JP); Kazuya Iwata, Katano (JP); Tetsushi Kasahara, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 365 days.

(21) Appl. No.: 10/479,376

(22) PCT Filed: May 24, 2002

(86) PCT No.: PCT/JP02/05086

§ 371 (c)(1),
(2), (4) Date: Dec. 1, 2003

(87) PCT Pub. No.: WO02/099662

PCT Pub. Date: Dec. 12, 2002

(65) Prior Publication Data

US 2004/0158650 A1    Aug. 12, 2004

(30) Foreign Application Priority Data

May 30, 2001    (JP)    ............................ 2001-162876

(51) Int. Cl.
*G06F 13/42*    (2006.01)
(52) U.S. Cl. .................. 710/105; 710/110; 710/260
(58) Field of Classification Search ................ 710/100, 710/104, 105, 110, 260, 262–264, 266, 267, 710/315

See application file for complete search history.

(56) References Cited

U.S. PATENT DOCUMENTS

| 5,327,121 A * | 7/1994 | Antles, II .................... 710/110 |
| 5,671,421 A * | 9/1997 | Kardach et al. ............. 710/260 |
| 5,692,199 A * | 11/1997 | Kikinis et al. ............... 710/260 |
| 5,848,278 A * | 12/1998 | Sakai .......................... 710/260 |
| 6,038,629 A * | 3/2000 | Ogilvie et al. .............. 710/312 |
| 6,295,573 B1 * | 9/2001 | Bailey et al. ................ 710/260 |
| 6,772,264 B1 * | 8/2004 | Dayan et al. ................ 710/303 |
| 2005/0053095 A1 * | 3/2005 | Kato et al. .................. 370/474 |

FOREIGN PATENT DOCUMENTS

| EP | 0644489 | 3/1995 |
| JP | 54107235 | 8/1979 |

(Continued)

OTHER PUBLICATIONS

Definition of Interrupt from Wikipedia.*

*Primary Examiner*—Khanh Dang
(74) *Attorney, Agent, or Firm*—Greenblum & Bernstein, P.L.C.

(57) ABSTRACT

A small-sized and low-cost transmission apparatus and a transmission method (having a high responsivity) capable of transmitting an interrupt signal with a small number of input/output terminals (without a dedicated line for interrupt signals) are provided. A first transmission apparatus of the present invention comprises a central processing unit for carrying out an interrupt process in response to an interrupt signal; an input/output section having at least one data line for transmitting data signals between a second transmission apparatus and the first transmission apparatus and for transmitting an interrupt signal from the second transmission apparatus to the first transmission apparatus; and an interrupt signal detecting section for detecting an interrupt signal from among signals transmitted from the second transmission apparatus via the data line.

6 Claims, 10 Drawing Sheets

FOREIGN PATENT DOCUMENTS

| | | |
|---|---|---|
| JP | 54121632 | 9/1979 |
| JP | 03001261 | 1/1991 |
| JP | 05-128060 | 5/1993 |
| JP | 7105031 | 4/1995 |

* cited by examiner (a)

(b)

(c)

(a) FIRST TRANSMISSION MODE (b) SECOND TRANSMISSION MODE (a)

(b)

(c)

TRANSMISSION APPARATUS AND TRANSMISSION METHOD

TECHNICAL FIELD

The present invention relates to a transmission apparatus and a transmission method.

BACKGROUND ART

Today, many types of digital signal processing units such as a computer, a digital video signal processing unit, and a digital audio signal processing unit are in practical use. Moreover, the variety of users' demands for each digital signal processing unit has increased.

As one of the methods for providing a digital signal processing unit capable of responding to the variety of users' preferences, the digital signal processing unit can be provided with an assortment of optional equipments attachable thereto. Users can obtain the digital signal processing unit equipped with the suitable features for their preferences by selecting from among the assortment of optional equipments and attaching the selected optional equipment to the digital signal processing unit.

In order to provide various types of optional equipments, there emerges a need for the standardization of the signal transmission between the digital signal processing unit and the optional equipment. The standardized protocol for signal transmission must be capable of transmitting various signals required in each optional equipment.

In many cases, the signal transmission protocol between the digital signal processing unit and the optional equipment is a master/slave method. In the system of the master/slave method in general, the digital signal-processing unit is a master and the optional equipment is a slave. In communications using the master/slave method, the digital signal processing unit acting as a master usually determines what kind of signal will be transmitted from the digital signal processing unit to the optional equipment and what kind of signal will be transmitted from the optional equipment to the digital signal processing unit.

Referring to FIG. 9 and FIG. 10, the prior art transmission system will be described.

FIG. 9 is a block diagram of the prior art transmission system. The transmission system in FIG. 9 comprises a first transmission apparatus 901 and a second transmission apparatus 902.

The first transmission apparatus 901 is a digital signal processing unit; the second transmission apparatus 902 is an optional equipment thereof. The second transmission apparatus 902 in FIG. 9 is an option card complying with the standard protocol for IC cards. The second transmission apparatus 902 is attached into an option slot provided to the first transmission apparatus 901 and complying with the standard for IC cards, thereby communicating with the first transmission apparatus 901.

Since the present invention relates to a transmission apparatus and a transmission method, a digital signal processing unit and an optional equipment thereof having a transmission function are referred to as transmission apparatuses in this description.

The first transmission apparatus 901 in FIG. 9 is a personal digital assistant.

The first transmission apparatus 901 comprises a CPU 911, a first buffer memory 912 and a first input/output section 913. The CPU 911, the first buffer memory 912 and the first input/output section 913 are connected with each other via an internal bus 914 and can mutually transmit signals.

The second transmission apparatus 902 comprises a control section 921, a second buffer memory 922, an external input/output section 923 and a second input/output section 924. The control section 921 is connected with the second buffer memory 922, the external input/output section 923 and the second input/output section 924, and can transmit signals to each other. The second buffer memory 922 is connected with the control section 921 and the second input/output section 924, and can transmit signals to each other.

The external input/output section 923 in the second transmission apparatus 902 is connected with an external device.

The first input/output section 913 and the second input/output section 924 can mutually transmit data signals and the like according to the standard protocol for IC cards. In the signal transmission shown in FIG. 9, the first transmission apparatus 901 is a master and the second transmission apparatus 902 is a slave.

The CPU 911 in the first transmission apparatus 901 can transmit command signals and data signals to the second transmission apparatus 902 and receive response signals and data signals from the second transmission apparatus 902 via the first input/output section 913 and the second input/output section 924.

Through the use of the above-mentioned transmission system, the first transmission apparatus 901 not only can communicate with the second transmission apparatus 902, but also can communicate with the external device connected to the external input/output section 923. In the communications between the first transmission apparatus 901 and the external device, the second transmission apparatus 902 acts as an intermediary for their communications.

The first input/output section 913 and the second input/output section 924 are connected to each other by nine lines consisted of one command line 931, four data lines 932, one clock line 933, one power source line 934 and two ground lines 935 (which comply with one of the standard specifications of IC cards).

Hereinafter, the signal transmission method complying with the standard protocol for IC cards will be described.

The second transmission apparatus 902 is supplied with power from the first transmission apparatus via the power source line 934.

The first input/output section 913 and the second input/output section 924 carry out synchronous data transmission to each other. In the synchronous data transmission, signals are bidirectionally transmitted via the command line 931 or the data lines 932 in synchronous with the clock signals transmitted from the first input/output section 913 to the second input/output section 924 via the clock line 933.

For each of the command line 931 and the four data lines 932, each of the first input/output section 913 and the second input/output section 924 comprises: an output section (having a three-state function wherein an output impedance becomes high in input mode) having a full duplex data buffer for outputting a signal in synchronous with a clock signal; and an input section having a full duplex data buffer for inputting a signal in synchronous with a clock signal.

The full duplex data buffer for transmission comprises: a parallel-in/serial-out shift register which stores a data signal in the process of being sent; and a parallel-in/parallel-out register which stores the next data signal to be sent. When the parallel-in/serial-out shift register has finished transmitting the data signal in the process of being sent, the data signal stored in the parallel-in/parallel-out register is automatically loaded into the parallel-in/serial-out shift register. The parallel-in/serial-out shift register keeps transmitting data signals.

When the data signal stored in the parallel-in/parallel-out register is loaded into the parallel-in/serial-out shift register, the CPU 911 in the first transmission apparatus (or either the control section 921 or the second buffer memory 922 in the second transmission apparatus) loads the next data signal into the parallel-in/parallel-out register before the completion of transmitting the data signal loaded into the parallel-in/serial-out shift register.

Likewise, the full duplex data buffer for reception comprises: a serial-in/parallel-out shift register which stores a data signal in the process of being received; and a parallel-in/parallel-out register which stores the received data signal. When the serial-in/parallel-out shift register has finished receiving the data signal in the process of being received, the data signal stored in the serial-in/parallel-out shift register is automatically loaded into the parallel-in/parallel-out register. The serial-in/parallel-out shift register keeps receiving data signals.

When the data signal stored in the serial-in/parallel-out shift register is loaded into the parallel-in/parallel-out register, the CPU 911 in the first transmission apparatus (or either the control section 921 or the second buffer memory 922 in the second transmission apparatus) processes the data signal loaded into the parallel-in/parallel-out register before the serial-in/parallel-out shift register finishes receiving a new data signal again.

Thus, data signals are transmitted continuously regardless of the information amount of the data signals.

The CPU 911 in the first transmission apparatus 901 can transmit various types of command signals or data signals to the second transmission apparatus 902 via the-first input/output section 913 and the second input/output section 924. In response to the command signal transmitted from the first transmission apparatus 901, the control section 921 in the second transmission apparatus 902 transmits various types of response signals or response signals and data signals to the first transmission apparatus 901 via the second input/output section 924 and the first input/output section 913.

Parts (a) to (c) of FIG. 10 are timing charts showing various types of signal transmission between the first input/output section 913 and the second input/output section 924.

The signal transmission shown in part (a) of FIG. 10 will be described. First, the CPU 911 transmits a command signal 1001 to the second transmission apparatus 902 via the first input/output section 913, the command line 931 and the second input/output section 924. The transmitted command signal 1001 (which can be a command signal with data) is only for requesting a response signal, not for requesting the transmission of the data signal. After receiving the command signal 1001, the control section 921 generates a response signal responding to the command signal and transmits the response signal 1002 to the first transmission apparatus 901 via the second input/output section 924, the command line 931 and the first input/output section 913.

The command signal 1001 and the response signal 1002 are transferred in synchronous with a clock signal to be transmitted via the clock line 933. In part (a) of FIG. 10, the data lines 932 are not used as shown by the numeral 1004.

The signal transmission shown in part (b) of FIG. 10 will be described. First, the CPU 911 transmits a command signal 1011 to the second transmission apparatus 902 via the first input/output section 913, the command line 931 and the second input/output section 924. The transmitted command signal 1011 determines what kind of data signal is to be transmitted from the first transmission apparatus 901 to the second transmission apparatus 902. After receiving the command signal 1011, the second transmission apparatus is informed that a data signal is to be inputted. The control section 921 generates a response signal 1012 responding to the command signal and transmits the response signal 1012 to the first transmission apparatus 901. The CPU 911 stores a data signal 1013 to be transmitted in the first buffer memory 912 and loads the first N bytes of the data signal 1013 to be transmitted into the first input/output section 913 (N bytes are the information amount of a data signal which can be loaded into the data buffer of the four data lines 932 in the first input/output section 913.).

Next, the first transmission apparatus 901 transmits the data signal 1013 stored in the first input/output section 913 and the first buffer memory 912 to the second transmission apparatus 902 via the first input/output section 913, the data lines 932 and the second input/output section 924. The data signal 1013 stored in the first buffer memory 912 is sequentially loaded in the data buffer of the first input/output section 913 and transmitted. The second transmission apparatus 902 stores the inputted data signal 1013 in the second buffer memory 922.

The command signal 1011, the response signal 1012 and the data signal 1013 are transferred in synchronous with a clock signal to be transmitted via the clock line 933.

The CPU 911 transmits a command signal 1014 to the second transmission apparatus 902 via the first input/output section 913, the command line 931 and the second input/output section 924. The transmitted command signal 1014 is for requesting a data signal to be transmitted from the second transmission apparatus 902 to the first transmission apparatus 901. The control section 921 generates a response signal 1015 responding to the command signal and transmits the response signal 1015 to the first transmission apparatus 901. After receiving the command signal 1014, the second transmission apparatus 902 stores a data signal 1016 requested by the second buffer memory 922 and loads the first N bytes of the requested data signal 1016 into the second input/output section 924 (N bytes are the information amount of a data signal which can be loaded into the data buffer of the four data lines 932 in the second input/output section 924.).

Then, the first transmission apparatus 901 transmits a clock signal to the second transmission apparatus 902 via the clock line 933. The data signal 1016 requested by the first transmission apparatus 901 is transferred from the second transmission apparatus to the first transmission apparatus 901. The data signal 1016 stored in-the second input/output section 924 and the second buffer memory 922 is transmitted to the first transmission apparatus 901 via the second input/output section 924, the data lines 932 and the first input/output section 913. The CPU 911 stores the inputted data signal 1016 in the first buffer memory 912.

The command signal 1014, the response signal 1015 and the data signal 1016 are transferred in synchronous with a clock signal to be transmitted via the clock line 933.

The signal transmission shown in part (c) of FIG. 10 will be described. The signal transmission shown in part (c) of FIG. 10 is basically the same as that shown in part (b) of FIG. 10. The information amount of the data signal transmitted in the signal transmission shown in part (c) of FIG. 10 is larger than the information amount of the data signal transmitted in the signal transmission of part (b) of FIG. 10. This is the only difference between them.

The CPU 911 transmits a command signal 1021 to the second transmission apparatus 902 via the first input/output section 913, the command line 931 and the second input/output section 924. In response to the transmitted command signal 1021, a response signal 1022 is transmitted from the first transmission apparatus 901 to the second transmission apparatus 902. Then, a data signal 1023 is transmitted from the first transmission apparatus 901 to the second transmission apparatus 902, or from the second transmission apparatus 902 to the first transmission apparatus 901. The details of the transmission method are the same as those of the method described in part (b) of FIG. 10.

The information amount of a data signal to be transmitted varies between part (b) of FIG. 10 and part (c) of FIG. 10; however, as described above, the first input/output section 913 and the second input/output section 924 each having a full duplex data buffer continuously transmit data signals.

As shown in parts (a) to (c) of FIG. 10, in the transmission system of FIG. 9, the levels of the command line 931 and the four data lines 932 become high when a signal is not transmitted.

In parts (b) and (c) of FIG. 10, data signals are transmitted via the four data lines 932. As for the four data lines 932, there are cases where all of them are used at the same time and where only one of them is used.

As described above, it is impossible for the optional equipment acting as a slave to transmit a signal to the digital signal processing unit or make the digital signal processing unit transmit a signal to the optional equipment unless the digital signal processing unit acting as a master specifies the transmission of the signals, even if there is a signal which needs to be transmitted from the optional equipment to the digital signal processing unit or from the digital signal processing unit to the optional equipment.

However, some of the optional equipments (required a high responsivity) are required to process signals quickly in response to the requests from external devices and so on. So they cannot wait for the digital signal processing unit acting as a master to specify the transmission of the signals which should be processed.

In order for the optional equipment acting as a slave to make the digital signal processing unit acting as a master designate preferentially the transmission of the signals which should be processed, there is a method in which an interrupt signal is transmitted from the optional equipment to the digital signal processing unit. The central processing unit (referred to as "CPU") of the digital signal processing unit inputs the interrupt signal and carries out the interrupt process. In the interrupt process, the CPU designates the signal transmission requested by the optional equipment preferentially and the requested signal is transmitted between the optional equipment and the digital signal processing unit.

If, however, a data line for transmitting data signals and an interrupt signal line for transmitting interrupt signals are provided independently, the digital signal processing unit and the optional equipment would need to have many input/output terminals.

There is a strong demand for a digital signal processing unit and an optional equipment to be downsized in the market. The transmission system which comprises a digital signal processing unit and an optional equipment having many input/output lines (having data signal lines and an interrupt signal line independently) has a high responsivity; however, in such a system it is difficult to provide a small-sized and low-cost digital signal processing unit and a small-sized and low-cost optional equipment.

The present invention is to provide a small-sized and low-cost transmission apparatus and a transmission method (having a high responsivity) capable of transmitting an interrupt signal with a small number of input/output terminals (without a dedicated line for interrupt signals).

If a dedicated line for interrupt signals is added to the optional equipment complying with the standard where no dedicated line for interrupt signals is provided, the compatibility between the optional equipment with the interrupt signal line and the standard optional equipment without the interrupt signal line would not be maintained. This kind of optional equipment is extremely user-unfriendly.

As the optional equipment complying with the standard where no dedicated line for interrupt signals is provided, IC cards and applied products thereof shown in the prior art and Embodiments can be taken as examples.

The present invention is to provide a transmission apparatus and a transmission method (having a high responsivity) complying with the standard where no dedicated line for interrupt signals is provided as, for example, the standard for IC cards described in this description and capable of transmitting interrupt signals.

DISCLOSURE OF INVENTION

In order to solve the above-mentioned problems, the present invention is configured as follows:

A first transmission apparatus in accordance with one aspect of the present invention comprises: a central processing unit for carrying out an interrupt process in response to an interrupt signal; an input/output section having at least one data line for transmitting data signals between a second transmission apparatus and the first transmission apparatus and for transmitting an interrupt signal from the second transmission apparatus to the first transmission apparatus; and an interrupt signal detecting section for detecting an interrupt signal from among signals transmitted from the second transmission apparatus via the data line.

A second transmission apparatus in accordance with another aspect of the present invention comprises: an input/output section having at least one data line for transmitting data signals between a first transmission apparatus and the second transmission apparatus and for transmitting an interrupt signal from the second transmission apparatus to the first transmission apparatus; a data signal quiescent period detecting section for detecting a data signal quiescent period during which no data signal is transmitted on the data line; and an interrupt signal generating section for transmitting an interrupt signal to the input/output section during the data signal quiescent period.

A transmission method in accordance with another aspect of the present invention is a transmission method between a first transmission apparatus and a second transmission apparatus having a data signal transmitting step of transmitting a data signal via a data line; a data signal quiescent period detecting step of detecting a data signal quiescent period during which no data signal is transmitted on the data line in the second transmission apparatus; an interrupt signal transmitting step of transmitting an interrupt signal from the second transmission apparatus to the first transmission apparatus during the data signal quiescent period; and an interrupt processing step of carrying out an interrupt process in the first transmission apparatus based on the interrupt signal.

By configuring a transmission system comprising a first transmission apparatus and a second transmission apparatus in accordance with the present invention, it is possible to provide a transmission system and a transmission method (having a high responsivity) capable of transmitting an interrupt signal with a small number of input/output terminals (without a dedicated line for interrupt signals).

By configuring a transmission system comprising a first transmission apparatus and a second transmission apparatus in accordance with the present invention, it is possible to provide a transmission system and a transmission method (having a high responsivity) complying with the standard where no dedicated line for interrupt signals is provided (without loss of compatibility) and capable of transmitting an interrupt signal.

Thus, it is possible to provide a master/slave type transmission system and transmission method having a high responsivity through the use of interrupt signals.

"Interrupt signal" means a signal for requesting a-central processing unit ("CPU") to carry out an interrupt process.

"The transmission of data signals between a second transmission apparatus and a first transmission apparatus" means that data signals can be transmitted from the second transmission apparatus to the first transmission apparatus and that data signals can be also transmitted from the first transmission apparatus to the second transmission apparatus.

In the above-mentioned first transmission apparatus in accordance with another aspect of the present invention, the interrupt signal detecting section comprises a data signal quiescent period detecting section for detecting a data signal quiescent period during which the above-mentioned data signals are not transmitted on the data line(s); and detects the signal transmitted during the data signal quiescent period detected by the data signal quiescent period detecting section as an interrupt signal.

The present invention has the effect of making it possible to provide a first transmission apparatus which properly detects an interrupt signal from among data signals and interrupt signals transmitted on a data line.

Furthermore, in the above-mentioned first transmission apparatus in accordance with another aspect of the present invention, the input/output section further comprises a command line for transmitting command signals at least from the first transmission apparatus to the second transmission apparatus, and transmits data signals between the second transmission apparatus and the first transmission apparatus via the data line in response to the command signals; the data signal quiescent period detecting section detects any given period in a period from the end of a data signal transmitted in response to the command signal to the end of the next command signal to transfer a data signal on a data line as the data signal quiescent period.

In the above-mentioned second transmission apparatus in accordance with the present invention, the input/output section further comprises at least a command line for transmitting command signals from the first transmission apparatus to the second transmission apparatus; the data line transmits data signals between the first transmission apparatus and the second transmission apparatus in response to the command signals; and the data signal quiescent period detecting section detects any given period in a period from the end of a data signal transmitted in response to the command signal to the end of the next command signal to transfer a data signal on a data line as the data signal quiescent period.

In a protocol where a data signal is transmitted after the transmission of a command signal in response to the command signal, as is the case of, for example, the protocol for IC cards described in this description, a data line is not used during a period from the completion of transmitting a data signal to the completion of transmitting a next command signal to transfer a data signal on the data line. In a transmission apparatus complying with this protocol, if a period from the completion of transmitting a data signal to the completion of transmitting a next command signal to transfer a data signal on a data line is defined as a data signal quiescent period, and if an interrupt signal is transmitted via the data line during this period, the interrupt signal can be transmitted without interrupting the normal transmission of data signals. It is also easy to distinguish an interrupt signal from data signals.

A transmission apparatus according to the present invention has a protocol where a data signal is transmitted after the transmission of a command signal and an interrupt signal is transmitted via a data line during the period which occurs on the basis of the protocol and where data signals are not transmitted.

A transmission apparatus according to the present invention has a protocol where a data signal is transmitted after the transmission of a command signal and detects a signal received via a data line during the period which occurs on the basis of the protocol and where data signals are not transmitted as an interrupt signal.

In the above-mentioned first transmission apparatus in accordance with another aspect of the present invention, the data signal quiescent period detecting section detects any given period in the first period $T_1$ ($T_1$ is any given period) starting from the end of a data signal as the data signal quiescent period.

In the above-mentioned second transmission apparatus in accordance with another aspect of the present invention, the data signal quiescent period detecting section detects any given period in the first period $T_1$ ($T_1$ is any given period) starting from the end of a data signal as the data signal quiescent period.

In a transmission apparatus complying with the transmission protocol where, for a certain period after the completion of transmitting a data -signal, the transmission of the next data signal is disabled, a certain period $T_1$ after the completion of transmitting a data signal is defined as a data signal quiescent period; and during this period, an interrupt signal is transmitted via a data line. In this way, it is possible to transmit an interrupt signal without interrupting the normal transmission of data signals. It is also easy to distinguish an interrupt signal from data signals.

A transmission apparatus according to the present invention has a transmission protocol where, for a certain period after the completion of transmitting a data signal, the transmission of the next data signal is disabled; and an interrupt signal is transmitted via a data line during the period which occurs on the basis of the protocol and where data signals are not transmitted.

A transmission apparatus according to the present invention has a transmission protocol where, for a certain period after the completion of transmitting a data signal, the transmission of the next data signal is disabled; and detects a signal received via a data line during the period which occurs on the basis of the protocol and where data signals are not transmitted as an interrupt signal.

In the above-mentioned second transmission apparatus in accordance with another aspect of the present invention, the input/output section transmits a data signal, and transmits the next data signal after expiring at least a second period $T_2$ starting from the end of the data signal; the second period $T_2$ is a period which is at least one clock longer than the first period $T_1$.

In the above-mentioned second transmission apparatus in accordance with another aspect of the present invention, the data signal quiescent period detecting section detects a period starting at the point when the third period $T_3$ ($T_3$ is a period of one clock or more) has elapsed from the end of a data signal and ending at the point when the fourth period $T_4$ ($T_4$ is any given period) has elapsed from the starting point as the data signal quiescent period.

In the input/output section of the second transmission apparatus, a part of hardware for use is generally switched between the time of transmitting/receiving data signals and the time of transmitting interrupt signals. Especially in the second transmission apparatus carrying out the synchronous transmission of data signals, it is necessary to switch hardware between the time of transmitting of a data signal with the input of a clock signal and the transmission of an interrupt signal without a clock signal. This switching of hardware requires a certain time. The changing direction of data transfer also requires a certain time. For example, in the second transmission apparatus which requires switching hardware between the time of transmitting/receiving data signals and the time of transmitting interrupt signals, the transmission of an interrupt signal is disabled for a certain period after the completion of transmitting/receiving a data signal and is completed before at least a certain period earlier than the start of transmitting the next data signal. The completion of switching hardware during this certain period can prevent the transmission error caused by carrying out signal transmission during switching hardware and so on.

A time of one clock means a cycle of a clock signal outputting a data signal via a data line.

The above-mentioned first transmission apparatus in accordance with another aspect of the present invention further comprises: a data signal generating section for generating a data signal to be transmitted from the first transmission apparatus to the second transmission apparatus; and a data signal dividing section for dividing the data signal to generate a plurality of divided data signals each having less than a certain amount of information, if the data signal has a certain amount of information or more; wherein the input/output section transmits a plurality of divided data signals sequentially from the first transmission apparatus to the second transmission apparatus via the data line and has at least a certain transmission quiescent period after the completion of transmitting one of the divided data signals and before the start of transmitting the next one of the divided data signals.

The above-mentioned second transmission apparatus in accordance with another aspect of the present invention further comprises: a data signal generating section for generating a data signal to be transmitted from the second transmission apparatus to the first transmission apparatus; and a data signal dividing section for dividing the generated data signal to generate a plurality of divided data signals each having less then a certain amount of information, if the generated data signal has a certain amount of information or more; in the second transmission apparatus, the input/output section transmits a plurality of divided data signals sequentially from the second transmission apparatus to the first transmission apparatus via the data line(s) and has at least a certain transmission quiescent period after the completion of transmitting one of the divided data signals and before the start of transmitting the next one of the divided data signals.

In the first transmission apparatus and the second transmission apparatus, the above-mentioned transmission method in accordance with another aspect of the present invention comprises: a data signal generating step of generating a data signal to be transmitted; a data signal dividing step of dividing the generated data signal to generate a plurality of divided data signals each having less than a certain amount of information, if the data signal generated in the data signal generating step has a certain amount of information or more; and a data signal transmitting step of transmitting a plurality of divided data signals sequentially via the data line(s) and providing at least a certain transmission quiescent period after the completion of transmitting one of the divided data signals and before the start of transmitting the next one of the divided data signals.

In the prior art transmission apparatus, as described in the prior art (FIG. 10), data signals in a chunk are transmitted continuously. Therefore, if data signals had an extremely large amount of information, it was impossible to transmit an interrupt signal until the transmission of the data signals had been completed. An interrupt signal is a signal in urgent need of signal processing. If the information amount of data signals being continuously transmitted is too large, there may be cases of being too late for signal processing requested by an interrupt signal before the completion of transmitting the data signal.

In the transmission apparatus and the transmission method in accordance with the present invention, if the information amount of a data signal is too large, the data signal is divided into data signals each having less than a certain amount of information. By combining the present invention with the above-mentioned invention wherein an interrupt signal is transmitted during any period in a certain period starting from the end of a data signal, it is possible to provide a transmission apparatus and a transmission method wherein there is no possibility of being too late for transmitting an interrupt signal.

A first transmission apparatus in accordance with another aspect of the present invention comprises: a central processing unit for determining one transmission mode from among two or more transmission modes including a first transmission mode and a second transmission mode and for carrying out an interrupt process in response to an interrupt signal; and an input/output section having a plurality of data lines; wherein, in the first transmission mode, the input/output section transmits data signals via all of the data lines; in the second transmission mode, the input/output section transmits data signals via at least one of the data lines and receives an interrupt signal transmitted from the-second transmission apparatus to the first transmission apparatus via at least another one of the data lines.

A second transmission apparatus in accordance with another aspect of the present invention comprises: a transmission mode determining section for determining one transmission mode from among two or more transmission modes including a first transmission mode and a second transmission mode on the basis of the information about the transmission mode transmitted from the first transmission apparatus to the second transmission apparatus or on the basis of the command signal transmitted from the first transmission apparatus to the second transmission apparatus; an input/output section having a plurality of data lines; and an interrupt signal generating section for generating an interrupt signal and transmitting the interrupt signal to the input/output section; in the first transmission mode, the input/output section transmits data signals via all of the data lines; in the second transmission mode, the input/output section transmits data signals via at least one of the data lines and transmits the interrupt signal from the second transmission apparatus to the first transmission apparatus via at least another one of the data lines.

A transmission method in accordance with another aspect of the present invention is the method between a first transmission apparatus and a second transmission apparatus each having a plurality of data lines, and comprises: a transmission mode determining step of determining one transmission mode from among two or more transmission modes including a first transmission mode and a second transmission mode; a data signal transmitting step of transmitting data signals via all of the data lines in the first transmission mode; an interrupt signal transmitting step of transmitting data signals via at least one of the data lines in the second transmission mode and transmitting an interrupt signal from the second transmission apparatus to the first transmission apparatus via at least another one of the data lines; and an interrupt processing step of carrying out an interrupt process in response to the received interrupt signal in the first transmission apparatus.

The transmission apparatus and the transmission method in accordance with the present invention have two or more transmission modes. In the first transmission mode, data signals are transmitted using all of a plurality of data lines. In the second transmission mode, data signals are transmitted using part of the data lines and an interrupt signal is transmitted from the second transmission apparatus to the first transmission apparatus using another part of the data lines.

For example, when a data signal with a large amount of information is in urgent need for transmission (or in the second transmission apparatus (an optional equipment, for example) in such a need), the first transmission mode is used. When a data signal with a small amount of information is transmitted, or there is no urgent need to transmit the data signal but needs for carrying out an interrupt process sometimes arise (or in such a second transmission apparatus (an optional equipment, for example)), the second transmission mode is used. In the second transmission mode, an interrupt signal can be transmitted at any time from the second transmission apparatus to the first transmission apparatus.

The present invention has the effect of providing a transmission system and a transmission method (having a high responsivity) having a transmission mode for transmitting an interrupt signal by the use of a transmission apparatus with a small number of input/output terminals (with no dedicated line for interrupt signals).

The present invention has the effect of providing a transmission system and a transmission method (having a high responsivity) having a transmission mode for transmitting an interrupt signal by the use of a transmission apparatus complying with the standard where no dedicated line for interrupt signals is provided without loss of compatibility.

In the second transmission mode, the timing of transmitting a-data signal via any part of the data lines can be the same as or different from the timing of transmitting an interrupt signal via another part of the data lines.

For example, in the case of combining the first transmission apparatus compatible only with the first transmission mode with the second transmission apparatus compatible with multiple transmission modes, or in the case of combining the first transmission apparatus compatible with multiple transmission modes with the second transmission apparatus compatible only with the first transmission mode, the compatibility of the transmission system is maintained by using the first transmission mode only.

The above-mentioned first transmission apparatus in accordance with another aspect of the present invention further comprises an interrupt signal detecting section which has a data signal quiescent period detecting section and detects an interrupt signal from among signals transmitted from the second transmission apparatus via another one of the data lines; wherein the data signal quiescent period detecting section detects any given period in a period from the end of a data signal transmitted in response to a command signal transmitted from the first transmission apparatus to the second transmission apparatus to the end of the next command signal to transfer a data signal on a data line as the data signal-quiescent period; in the first transmission mode, the interrupt signal detecting section detects a signal transmitted via another one of the data lines during the data signal quiescent period as an interrupt signal; and in the second transmission mode, the interrupt signal detecting section detects a signal transmitted via another one of the data lines as an interrupt signal regardless of its transmission timing.

The above-mentioned second transmission apparatus in accordance with another aspect of the present invention further comprises a data signal quiescent period detecting section for detecting any given period in a period from the end of a data signal transmitted in response to a command signal transmitted from the first transmission apparatus to the second transmission apparatus to the end of the next one of the command signal to transfer a data signal on a data line as the data signal quiescent period; wherein in the first transmission mode, the input/output section transmits the interrupt signal via another one of the data lines only during the data signal quiescent period; in the second transmission mode, the input/output section transmits the interrupt Signal via another one of the data lines regardless of whether it is during the data signal quiescent period or not.

The present invention has the effect of providing a transmission system and a transmission method (having a high responsivity) wherein, in the first transmission mode, many data signals are transmitted at high speed and an interrupt signal is transmitted during a data signal quiescent period and in the second transmission mode, an interrupt signal is transmitted at high speed of response while maintaining the ability of transmitting data signals.

While the novel features of the present invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

BEST MODE FOR CARRYING OUT THE INVENTION

Hereinafter, embodiments showing specifically the best mode for carrying out the present invention will be described with reference to the accompanying drawings.

Embodiment 1

Referring to FIGS. 1 to 6, a transmission system in accordance with Embodiment 1 will be described.

Figure 1:
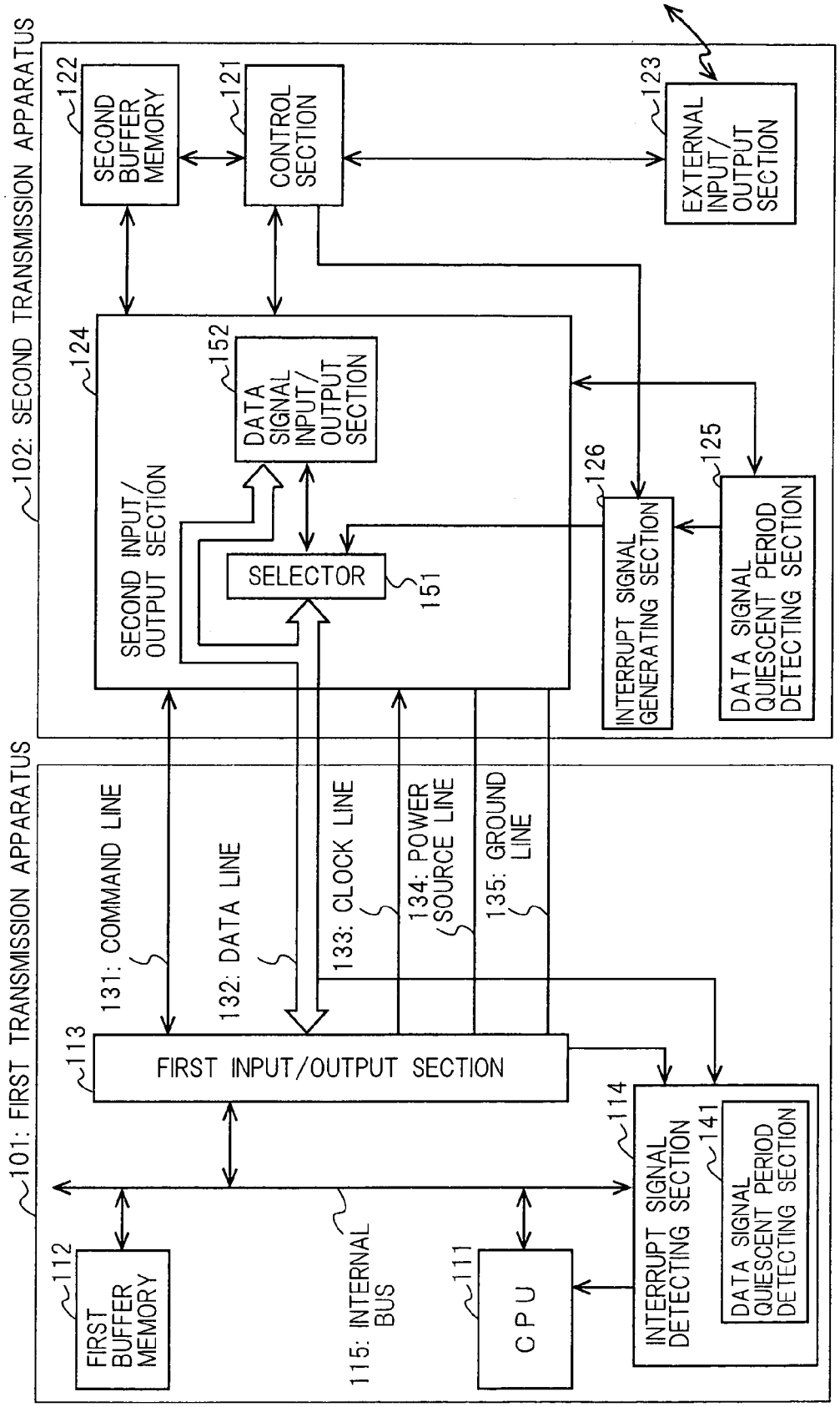
FIG. 1 is a block diagram of a transmission system in accordance with embodiments of the present invention.

FIG. 1 is a block diagram of the transmission system in accordance with Embodiment 1. The transmission system in FIG. 1 comprises a first transmission apparatus 101 and a second transmission apparatus 102.

The first transmission apparatus 101 is a digital signal processing unit; the second transmission apparatus 102 is an optional equipment thereof. The second transmission apparatus 102 in FIG. 1 is an option card, which is the same as that of the prior art, complying with the standard protocol for IC cards. The second transmission apparatus 102 is attached into an option slot provided to the first transmission apparatus 101 and complying with the standard for IC cards, thereby communicating with the first transmission apparatus 101.

The first transmission apparatus 101 in FIG. 1 is a personal digital assistant. The first transmission apparatus 101 can be any digital signal processing unit. For example, the first transmission apparatus 101 can be a digital video signal processing unit, a digital audio signal processing unit, a cellular phone or the like.

The first transmission apparatus 101 comprises a CPU 111, a first buffer memory 112, a first input/output section 113 and an interrupt signal detecting section 114. The interrupt signal detecting section 114 has a data signal quiescent period detecting section 141.

The CPU 111, the first buffer memory 112, the first input/output section 113 and the interrupt signal detecting section 114 are connected with each other via an internal bus 115 and can mutually transmit signals.

The second transmission apparatus 102 in FIG. 1 is a card which is an IC card with a wireless communication section (an external input/output section 123). The external input/output section 123 is the wireless communication section complying with the standard of Bluetooth (registered trademark). The external input/output section 123 carries out wireless communication with an external communication device having a wireless communication section of the Bluetooth standard.

The second transmission apparatus 102 is not limited to a card having a wireless communication section of the Bluetooth standard and a memory; the second transmission apparatus 102 can be, for example, a camera, a cellular phone using the PHS etc., a position detecting device using the GPS (Global Positioning System), a fingerprint authentication device, a terminal device on a LAN, a wireless communication device complying with other standards, or the like.

The second transmission apparatus 102 comprises a control section 121, a second buffer memory 122, the external input/output section 123, a second input/output section 124, a data signal quiescent period detecting section 125 and an interrupt signal generating section 126. The control section 121 is connected with the second buffer memory 122, the external input/output section 123 and the second input/output section 124, and can transmit signals to each other. The control section 121 can transmit an interrupt signal generating command to the interrupt signal generating section 126. The second buffer memory 122 is connected with the control section 121 and the second input/output section 124, and can transmit signals to each other.

The second input/output section 124 comprises a selector 151 and a data signal input/output section 152.

The selector 151 is a switching device for selecting alternatively a data signal or an interrupt signal. The selected signal is transmitted on one data line.

When a data signal is transmitted, the selector 151 connects the above-mentioned one data line with the data signal input/output section 152. The data signal outputted from the data signal input/output section 152 is transmitted via data lines 132 to the first input/output section 113, and the data signal transmitted from the first input/output section 113 is inputted to the data signal input/output section 152.

When an interrupt signal is transmitted, the selector 151 connects the above-mentioned one data line with the interrupt signal generating section 126. The interrupt signal outputted from the interrupt signal generating section 126 is transmitted via the data lines 132 to the first input/output section 113.

In Embodiment 1, the other three of the data lines 132 are not connected to the selector 151, but connected directly to the data signal input/output section 152. The other three data lines transmit data signals.

In an alternative transmission system of Embodiment 1, the selector 151 can switch each connection of the four data lines 132 in the same way as mentioned above. By using all of the four data lines 132 for transmitting interrupt signals, it is also possible to transmit four different kinds of interrupt signals via each of the four data lines 132.

The first input/output section 113 and the second input/output section 124 can mutually transmit data signals and the like according to the standard protocol for IC cards. In the signal transmission shown in FIG.1, the first transmission apparatus 101 is a master and the second transmission apparatus 102 is a slave.

The CPU 111 in the first transmission apparatus 101 can transmit command signals and data signals to the second transmission apparatus 102 and can receive response signals and data signals from the second transmission apparatus 102 via the first input/output section 113 and the second input/output section 124.

Through the use of the above-mentioned transmission system, the first transmission apparatus 101 not only can communicate with the second transmission apparatus 102, but also can transmit information to and from the external device communicating with the external input/output section 123. In the communications between the first transmission apparatus 101 and the external device, the second transmission apparatus 102 acts as an intermediary for their communications.

The first input/output section 113 and the second input/output section 124 are connected to each other by nine lines consisted of one command line 131, four data lines 132, one clock line 133, one power source line 134 and two ground lines 135 (which comply with the standard specifications of IC cards). The first input/output section 113 and the second input/output section 124 carry out signal transmission complying with the standard protocol for IC cards and the transmission of interrupt signals.

The second transmission apparatus 102 is supplied with power from the first transmission apparatus 101 via the power source line 134.

The first input/output section 113 and the second input/output section 124 carry out synchronous data transmission to each other. In the synchronous data transmission, signals are bidirectionally transmitted via the command line 131 or the data lines 132 in synchronous with the clock signals transmitted from the first input/output section 113 to the second input/output section 124 via the clock line 133.

For each of the command line 131 and the four data lines, each of the first input/output section 113 and the-second input/output section 124 comprises: an output section (having a three-state function wherein an output impedance becomes high in input mode) having a full duplex data buffer for outputting a signal in synchronous with a clock signal; and an input section having a full duplex data buffer for inputting a signal in synchronous with a clock signal. The full duplex data buffer for transmission and the full duplex data buffer for reception are detailed in the description about the prior art.

The CPU 111 in the first transmission apparatus 101 can transmit various types of command signals or data signals to the second transmission apparatus 102 via the first input/output section 113 and the second input/output section 124. In response to the command signal transmitted from the first transmission apparatus 101, the control section 121 in the second transmission apparatus 102 transmits various types-of response signals or data signals to the first transmission apparatus 101 via the second input/output section 124 and the first input/output section 113.

In the cases, for example, where the external input/output section 123 needs to transmit a data signal immediately in response to-the request of the external device and requires the first transmission apparatus to transmit the data signal in need for transmission, the control section 121 also transmits interrupt signals to the first transmission apparatus 101 via the interrupt signal generating section 126, the second input/output section 124 and the first input/output section 113.

Figure 6:
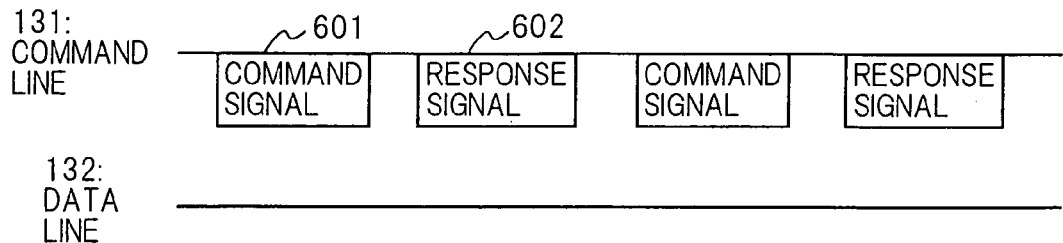
FIG. 6 is a timing chart showing various types of signal transmissions between a first transmission apparatus and a second transmission apparatus in a transmission system in accordance with Embodiment 1 of the present invention.
Figure 6:
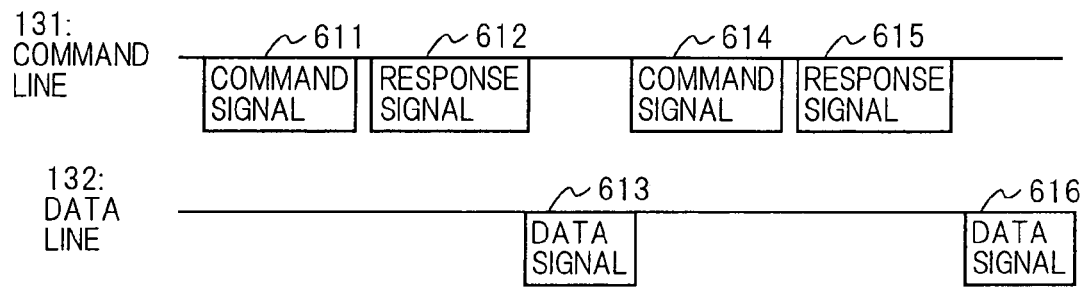
Figure 6:
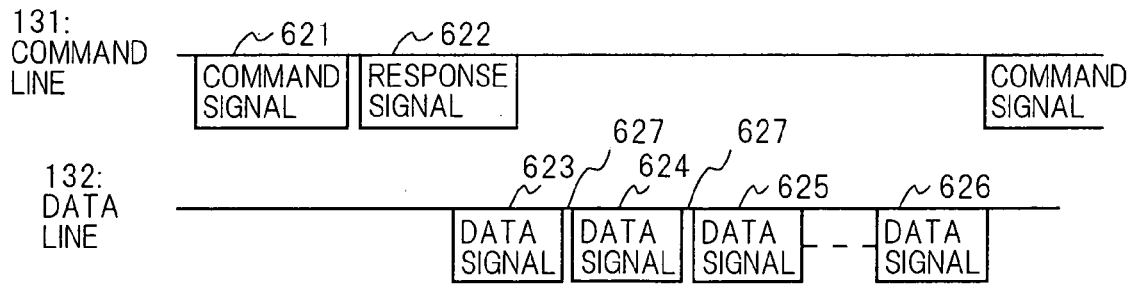

Parts (a) to (c) of FIG. 6 are timing charts showing various types of signal transmission between the first input/output section 113 and the second input/output section 124 (the transmission of interrupt signals is not shown in FIG. 6.).

Figure 10:
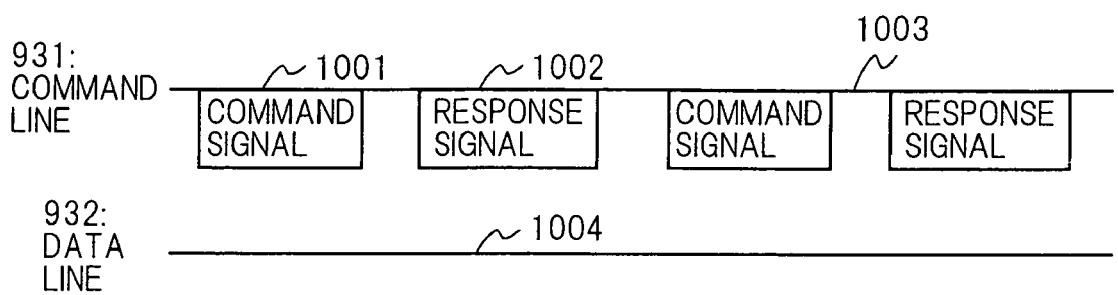
FIG. 10 is a timing chart showing various types of signal transmissions between a first transmission apparatus and a second transmission apparatus in the prior art transmission system.
Figure 10:
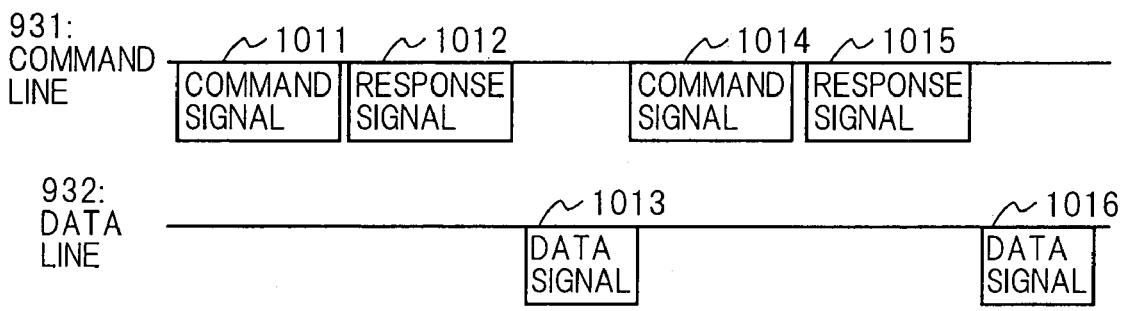
Figure 10:
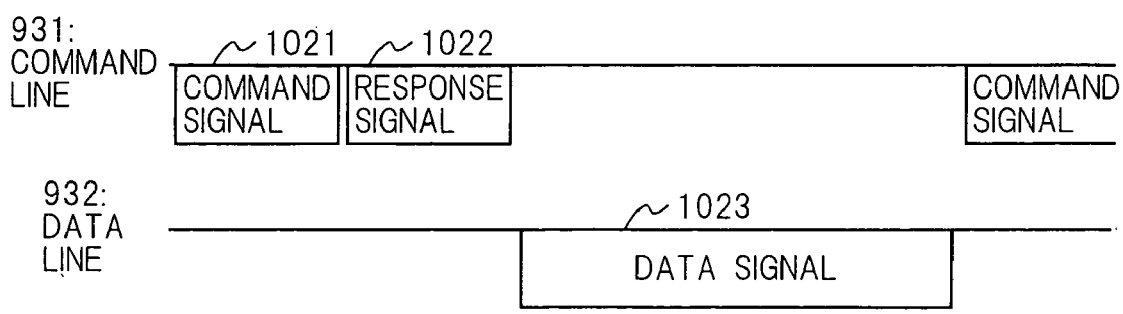

The signal transmission method shown in part (a) of FIG. 6 is the same as that shown in part (a) of FIG. 10. First, the CPU 111 transmits a command signal 601 (which can be a command signal with data) to the second transmission apparatus 102 via the first input/output section 113, the command line 131 and the second input/output section 124. The transmitted command signal 601 is only for requesting a response signal. After receiving the command signal 601, the control section 121 generates a response signal responding to the command signal and transmits the response signal 602 to the first transmission apparatus 101 via the second input/output section 124, the command line 131 and the first input/output section 113.

The command signal 601 and the response signal 602 are transferred in synchronous with a clock signal to be transmitted via the clock line 133. In part (a) of FIG. 6, the data lines 132 are not used as shown by the numeral 604.

The signal transmission method shown in part (b) of FIG. 6 is the same as that shown in part (b) of FIG. 10. First, the CPU 111 transmits a command signal 611 to the second transmission apparatus 102 via the first input/output section 113, the command line 131 and the second input/output section 124. The transmitted command signal 611 determines what kind of data signal is to be transmitted from the first transmission apparatus 101 to the second transmission apparatus 102. After receiving the command signal 611, the second transmission apparatus 102 is informed that a data signal is to be inputted. The control section 121 generates a response signal 612 responding to the command signal and transmits the response signal 612 to the first transmission apparatus 101. The CPU 111 stores a data signal 613 to be transmitted in the first buffer memory 112 and loads the first N bytes of the data signal 613 to be transmitted into the data buffer of the first input/output section 113 (N bytes are the information amount of a data signal which can be loaded into the data buffer of the four data lines 132 in the first input/output section 113.).

Next, the first transmission apparatus 101 transmits the data signal 613 stored in the first input/output section 113 and the first buffer memory 112 to the second transmission apparatus 102 via the first input/output section 113, the data lines 132 and the second input/output section 124. The data signal 613 stored in the first buffer memory 112 is sequentially loaded in the data buffer of the first input/output section 113 and transmitted. The second transmission apparatus 102 stores the inputted data signal 613 in the second buffer memory 122.

The command signal 611, the response signal 612 and the data signal 613 are transferred in synchronous with a clock signal to be transmitted via the clock line 133.

The CPU 111 transmits a command signal 614 (which can be a command signal with data) to the second transmission apparatus 102 via the first input/output section 113, the command line 131 and the second input/output section 124. The transmitted command signal 614 is for requesting a data signal to be transmitted from the second transmission apparatus 102 to the first transmission apparatus 101. The control section 121 generates a response signal 615 responding to the command signal and transmits the response signal 615 to the first transmission apparatus 101. After receiving the command signal 614, the second transmission apparatus 102 stores a data signal 616 requested by the second buffer memory 122 and loads the first N bytes of the requested data signal 616 into the data buffer of the second input/output section 124 (N bytes are the information amount of a data signal which can be loaded into the data buffer of the four data lines 132 in the second input/output section 124.).

Then, the first transmission apparatus 101 transmits a clock signal to the second transmission apparatus 102 via the clock line 133. The requested data signal 616 is transferred. The data signal 616 stored in the second input/output section 124 and the second buffer memory 122 is transmitted to the first transmission apparatus 101 via the second input/output section 124, the data lines 132 and the first input/output section 113. The CPU 111 stores the inputted data signal 616 in the first buffer memory 112.

The command signal 614, the response signal 615 and the data signal 616 are transferred in synchronous with a clock signal to be transmitted via the clock line 133.

Part (c) of FIG. 6 is described later.

As shown in parts (a) to (c) of FIG. 6, in the transmission system of FIG. 1, the levels of the command line 131 and the four data lines 132 become high when a signal is not transmitted.

In the data signal transmission described above, the selector 151 connects one of the data lines 132 with the data signal input/output section 152. The data signal transmission method is basically the same as that of the prior art.

Hereinafter, the transmission of interrupt signals is described.

Assuming that the external input/output section 123 receives a command signal or data signal transmitted from an external communication device, the control section 121 stores the received command signal or data signal in the second buffer memory 122.

For example, in the communication between the external communication device and the external input/output section 123, there is a case where the communication between them is cut off unless the response to a command signal is made in a certain amount of time. In this case, it takes a considerable time to restore the cut-off communication between them. In order to maintain the communication between them, a response has to be made in a certain amount of time given by standards. However, the second transmission apparatus 102 cannot get a necessary data signal immediately, because the first transmission apparatus 101 acting as a master designates the communication between the first transmission apparatus 101 and the second transmission apparatus 102. There are cases where the second transmission apparatus 102 cannot get a data signal necessary for responding to the external communication device in the above-mentioned certain amount of time.

In such cases, the necessary signal should be designated preferentially and transmitted in the communication between the first transmission apparatus 101 and the second transmission apparatus 102.

However, in the communication between the first transmission apparatus (a digital signal processing unit) 101 and the second transmission apparatus (an optional equipment) 102, the second transmission apparatus 102 acting as a slave is generally unable to get a necessary signal until the first transmission apparatus 101 acting as a master designates the transmission of the necessary signal. The second transmission apparatus 102 acting as a slave is also unable to transmit the necessary signal (such as a data signal stored in the second buffer memory 122) to the first transmission apparatus 101 until the first transmission apparatus 101 acting as a master designates the transmission of the necessary signal.

Therefore, in Embodiment 1, an interrupt signal is transmitted from the second transmission apparatus 102 acting as a slave to the first transmission apparatus 101 acting as a master so as to make the first transmission apparatus 101 designate the transmission of the necessary signal preferentially.

After inputting the interrupt signal, the CPU 111 carries out the interrupt process. In the interrupt process, the CPU 111 designates the signal transmission requested by the second transmission apparatus 102 preferentially and the requested signal is transmitted between the second transmission apparatus 102 and the first transmission apparatus 101.

When the external input/output section 123 receives a command signal or data signal transmitted from the external communication device, the control section 121 directs the interrupt signal generating section 126 to generate an interrupt signal. The interrupt signal generating section 126 directed to generate the interrupt signal gets the information about a data signal quiescent period (a period available for transmitting an interrupt signal) from the data signal quiescent period detecting section 125 and transmits the interrupt signal to the second input/output section 124 during the data signal quiescent period.

The selector 151 in the second input/output section 124 gets the information about a data signal quiescent period from the data signal quiescent period detecting section 125 and connects one of the data lines 132 with the interrupt signal generating section 126 during the data signal quiescent period. During a period other than the data signal quiescent period, the selector 151 connects one of the data lines 132 with the data signal input/output section 152.

The interrupt signal is transmitted to the CPU 111 via the selector 151 (the second input/output section 124), the data lines 132 and the first input/output section 113.

After inputting the interrupt signal, the CPU 111 carries out the interrupt process.

More specifically, the CPU 111 first transmits a command signal for inquiring of the second transmission apparatus 102 about the contents of the interrupt signal processing. Normally, the second transmission apparatus 102 transmits an interrupt signal to the first transmission apparatus 101 due to various causes. Depending on the type of the interrupt signal, the required processing varies. The CPU 121 (the second transmission apparatus 102) sends a response signal containing the specific contents of the interrupt signal back to the first transmission apparatus 101. According to the specific contents of the interrupt signal, the first transmission apparatus 101 carries out the necessary interrupt process. For example, the transmission of the necessary signal is designated preferentially and carried out.

If the type of the contents of the interrupt signal processing request is only one, the CPU 111 which has inputted the interrupt signal carries out the interrupt process immediately.

By carrying out the transmission of the necessary signal, the first transmission apparatus 101, for example, transfers the data signal stored in the second buffer memory 122 of the second transmission apparatus 102 to the first data buffer 112. For example, the first transmission apparatus 101 stores the necessary data signal in the first data buffer 112 and transfers the data signal stored in the first data buffer 112 to the second buffer memory 122 of the second transmission apparatus 102.

The system comprising the first transmission apparatus 101 and the second transmission apparatus 102 can always respond to the request from the external communication device within a certain amount of time; therefore, it can communicate with the external communication device continuously and without any breakdown of communications.

While monitoring the command line 131 and the data lines 132 of the second input/output section 124, the data signal quiescent period detecting section 125 detects a period during which no data signal is transmitted via the data lines 132 (a data signal quiescent period).

As described above, the interrupt-signal generating section 126 and the second input/output section 124 transmit interrupt signals via the data lines 132 during the data signal quiescent period. As a result of this, it is possible to avoid the collision of data signals with interrupt signals.

While monitoring the command line 131 and the data lines 132 of the first input/output section 113, the data signal quiescent period detecting section 141 in the first transmission apparatus detects a data signal quiescent period in the same manner as the data signal quiescent period detecting, section 125.

The interrupt signal detecting section 114 detects a signal inputted via the data lines 132 during the data signal quiescent period detected by the internal data signal quiescent period detecting section 141 as an interrupt signal. The interrupt signal detecting section 114 transmits the detected interrupt signal to the CPU 111.

The first transmission apparatus having the data signal quiescent period detecting section 141 can distinguish interrupt signals transmitted during the data signal quiescent period from data signals transmitted during the other period. Because the first transmission apparatus having the data signal quiescent period detecting section 141 does not affect the normal transmission in which no interrupt signal is transmitted, it can maintain the compatibility with transmission apparatuses provided no support for interrupt signals. The transmission method of normal data signals and the like is not changed; therefore, it becomes possible to provide a transmission apparatus having the function of transmitting interrupt signals and also complying with the transmission standards for normal data signals and the like (the standard for IC cards, for example).

Figure 3:
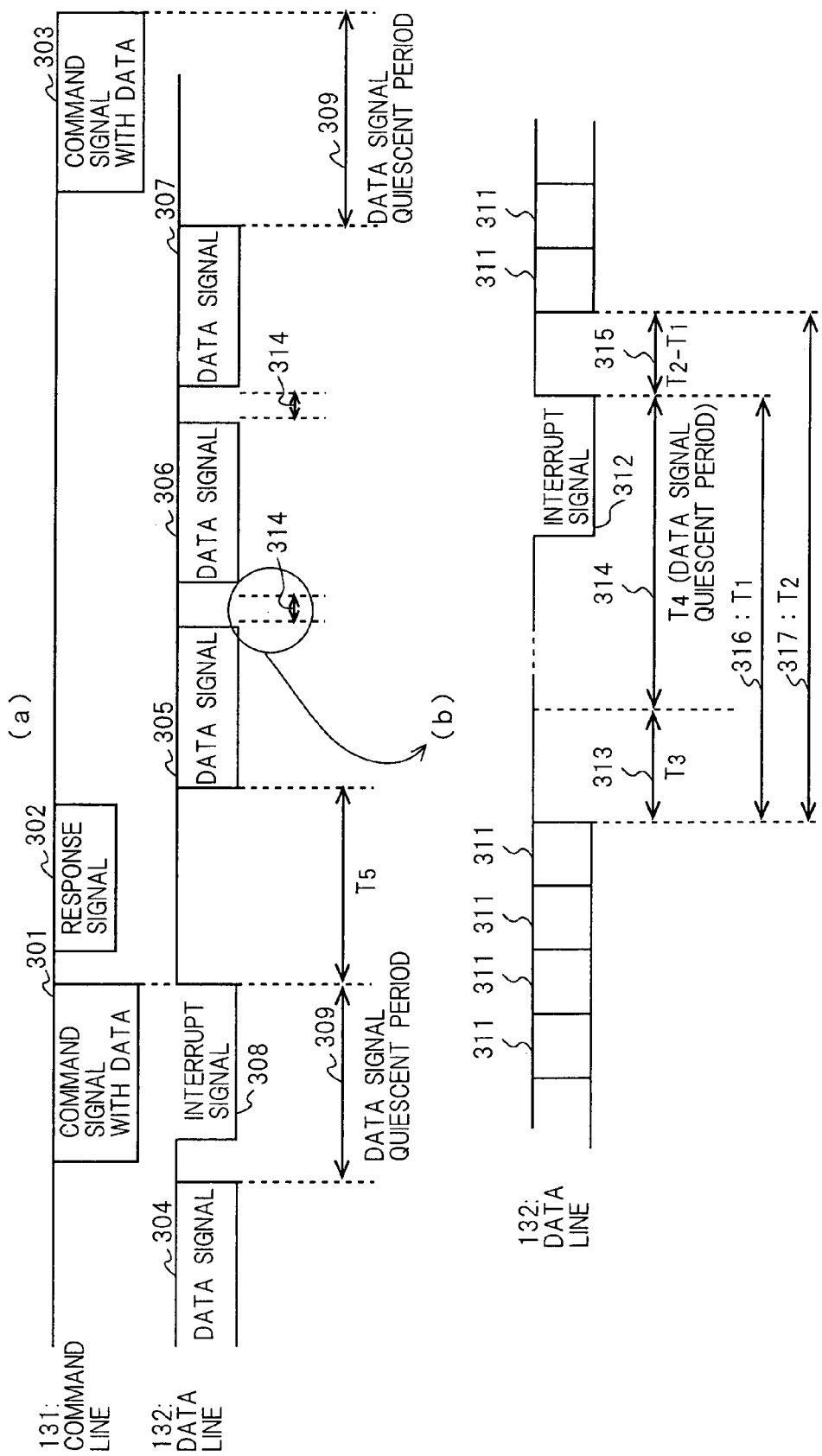
FIG. 3 is a timing chart for explaining a transmission period for interrupt signals.

Referring to FIG. 3, the method by which the data signal quiescent period detecting section 125 in Embodiment 1 detects a data signal quiescent period is described. The same method goes for the data signal quiescent period detecting section 141. FIG. 3 is a timing chart for explaining a transmission period for interrupt signals (a data signal quiescent period) in Embodiment 1.

The data signal quiescent period detecting section 125 detects two types of data signal quiescent period.

The first data signal quiescent period is a period from the end of a data signal transmitted in response to a command signal to the end of a next command signal to transfer a data signal on a data line (a data signal quiescent period 309 in part (a) of FIG. 3).

In the transmission system of Embodiment 1 complying with the protocol for IC cards, a command signal is transmitted first from the first transmission apparatus 101 to the second transmission apparatus 102 via the command line 131; then a response signal responding to the command signal is transmitted via the command line 131; and then, if necessary, a data signal is transmitted via the data lines 132. A data signal is not directly transmitted via the data lines. And if a command signal is only for requesting a response signal, a data signal is not transmitted via the data lines.

Thus, the data signal quiescent period detecting section 125 detects a period from the end of a data signal transmitted in response to a command signal to the end of a next command signal to transfer a data signal on a data line as a data signal quiescent period.

In part (a) of FIG. 3, when the data signal quiescent period detecting section 125 detects the end of a data signal transmitted in response to a command signal (the end of a data signal 304), it decides that the data signal quiescent period 309 has started. Then, the first transmission apparatus 101 transmits a command signal 301 to transfer a data signal on a data line. The data signal is not transmitted in a period when the command signal 301 is being transmitted; therefore, the transmission period of the command signal 301 is included in the data signal quiescent period 309. The data signal quiescent period detecting section 125 detects the end of the command signal 301 and decides that the data signal quiescent period 309 has ended at the above-mentioned end.

The data signal quiescent period detecting section detects the contents of the command signal. If the command signal is not for requesting the transmission of a data signal, the data signal quiescent period 309 shown in part (a) of FIG. 3 is extended until the next command signal to transmit a data signal is transmitted. The data signal quiescent period 309 is a period from the end of a data signal to the end of a command signal for requesting the transmission of a data signal.

The second transmission apparatus 102 can transmit an interrupt signal 308 during the data signal quiescent period 309. The level of the interrupt signal 308 changes from high to low at the beginning thereof and changes from low to high at the end thereof (which coincides with the end of the data signal quiescent period 309) (see parts (a) and (b) of FIG. 3).

In Embodiment, the transmission of a data signal 305 starts after at least a certain period $T_5$ has elapsed from the completion of transmitting the data signal 301. As an alternative to the method of Embodiment 1, the end of the data signal quiescent period 309 can be at the point after a certain period $T_6$ ($0<T_6 \leq T_5$) has elapsed from the end of the command signal.

The second data signal quiescent period is a period detected in the period from the end of a data signal to the beginning of the next data signal (a data signal quiescent period 314 in part (b) of FIG. 3).

As shown in part (a) of FIG. 3, in the transmission system of Embodiment 1, there is a case where divided data signals 305, 306 and 307 are transmitted continuously while each of them leaves a certain transmission quiescent period (the case will be described later in detail, referring to FIG. 4, FIG. 5 and part (c) of FIG. 6.).

The data signal quiescent period detecting section 125 detects the data signal quiescent period 314 between one divided data signal and another divided data signal.

Part (b) of FIG. 3 is a magnified view of the period between one divided data signal and another divided data signal. Each of the numeral 311s represents one bit of the data signals 305 and 306.

The data signal quiescent period detecting section 125 detects a period beginning at the point where the period $T_3$ represented by the numeral 313 has elapsed from the end of the data signal 305 (the end of the last one bit 311) and ending at the point where the period $T_1$ represented by the numeral 316 has elapsed from the end of the data signal 305 as the data signal quiescent period 314 (if the period is represented by $T_4$, $T_4=T_1-T_3$). If a period 317 between one divided data signal and another divided data signal is represented by $T_2$, $T_2$ is set to be longer than $T_1$ ($T_1<T_2$). $T_2$ is the minimum amount of time; therefore, there is actually a case where the period 317 is longer than $T_2$.

The second transmission apparatus 102 can transmit an interrupt signal 312 during the data signal quiescent period 314.

The selector 151 sends out an interrupt signal to the data lines 132 during a data signal quiescent period and transmits data signals via the data lines 132 during the other period than the data signal quiescent period. Accordingly, the selector 151 switches connections at the beginning and the end of the data signal quiescent period. Usually, it takes a certain amount of time to switch connections; therefore, if trying to transmit a data signal or interrupt signal while switching connections, the signal could not be transmitted properly.

The selector 151 in Embodiment 1 takes about one clock (A time of one clock means a cycle of a clock signal outputting a data signal via a data line) to switch connections. In the transmission system of Embodiment 1, therefore, the transmission of both a data signal and an interrupt signal is disabled for a certain period 313 ($=T_3$) from the point where the transmission of a data signal is completed and for a certain period 315 ($=T_2-T_1$) after the completion of the data signal quiescent period 314. In the transmission system of Embodiment 1, it is set to be $T_3=T_2-T_1=2$ clocks.

The data signal quiescent period detecting section 141 at the receiving end can detect the period $T_4$ (314) as a data signal quiescent period as is the case with the data signal quiescent period detecting section 125 at the transmitting end, or can detect the period $T_2$ or the period $T_1$ as a data signal quiescent period.

Figure 2:
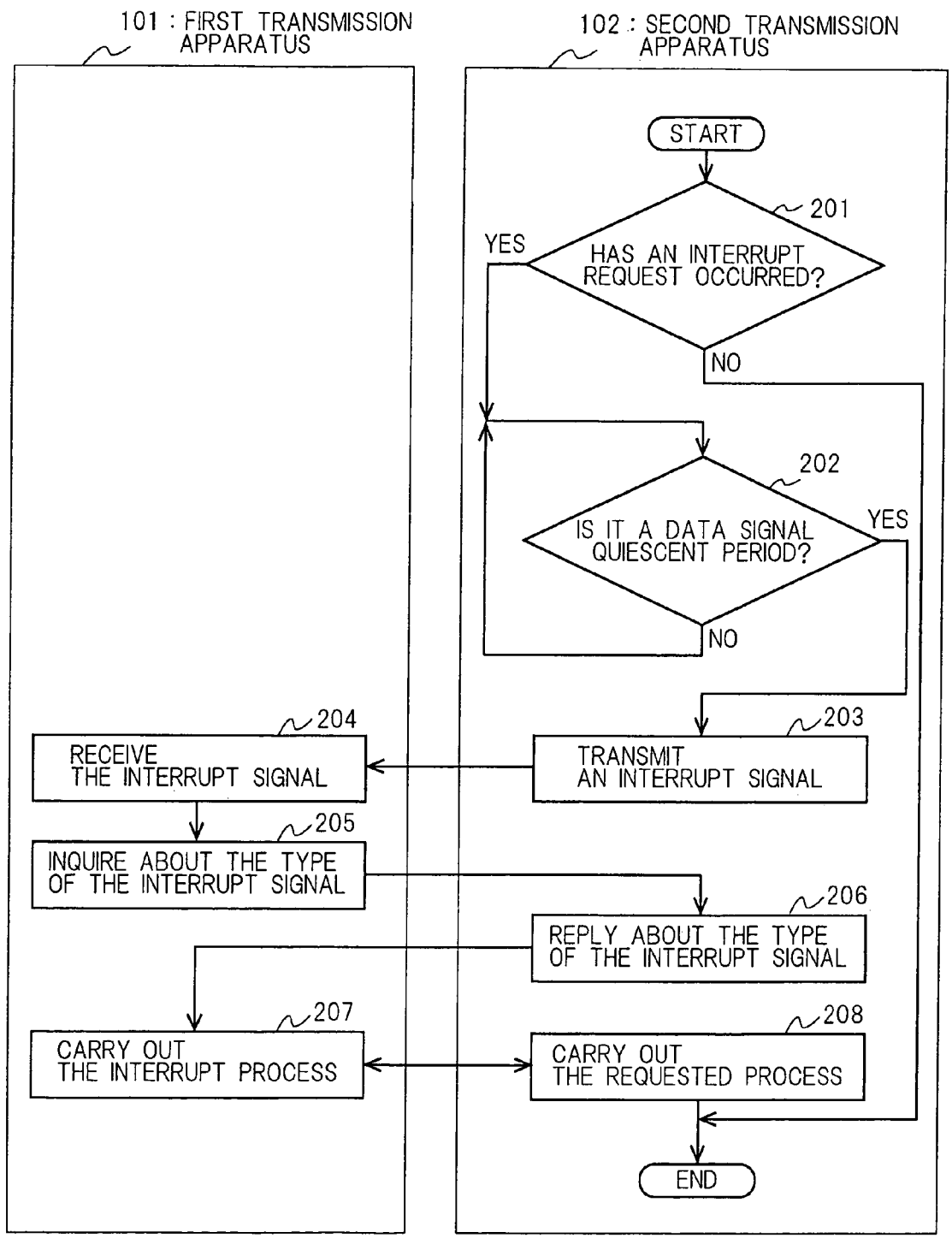
FIG. 2 is a flow chart showing a transmission method in accordance with Embodiment 1 of the present invention.

Referring to FIG. 2, the interrupt process in the transmission method of Embodiment 1 is described. FIG. 2 is a flow chart showing the interrupt process in the transmission method of Embodiment 1. In FIG. 2, the left part shows the process of the first transmission apparatus 101; the right part shows the process of the second transmission apparatus 102.

For example, the transmission of a data signal from the external communication device to the external input/output section 123 in the second transmission apparatus 102 generates an interrupt processing request in the second transmission apparatus 102.

The second transmission apparatus 102 checks whether an interrupt request has occurred or not (step 201). If the interrupt request has occurred, go to step 202; if the interrupt request has not occurred, end the process.

Step 202 is to check whether or not it is a data signal quiescent period at the moment. If it is a data signal quiescent period, go to step 203 because an interrupt signal can be transmitted. If it is not a data signal quiescent period, go back to step 202 because an interrupt signal cannot be transmitted. While repeating step 202, the second transmission apparatus 102 waits for the data signal quiescent period to begin.

At step 203, the second transmission apparatus 102 transmits an interrupt signal.

Then, the first transmission apparatus 101 receives the interrupt signal (step 204).

The first transmission apparatus 101 inquires of the second transmission apparatus 102 about the type of the interrupt signal (step 205). The second transmission apparatus 102 replies to the inquiry from the first transmission apparatus 101 about the type of the interrupt signal (step 206). The inquiry about the interrupt signal is made through the normal exchange of a command signal and a response signal.

After being informed about the type of the interrupt signal, the first transmission apparatus 101 carries out the interrupt process (step 207). When required, for example, a data signal is transmitted from the first transmission apparatus 101 to the second transmission apparatus 102, or a data signal transmission request is transmitted. The second transmission apparatus 102 carries out the process as required by the first transmission apparatus 101 (step 208). For example, the second transmission apparatus 102 transmits a data signal (which, for example, is the data signal transmitted from the first transmission apparatus 101 to the second transmission apparatus 102 through the interrupt process) requested by the external communication device via the external input/output section 123.

In the case where there is only one type of interrupt signal, the first transmission apparatus 101 carries out the interrupt process immediately after receiving the interrupt signal at step 204 (step 207).

Figure 4:
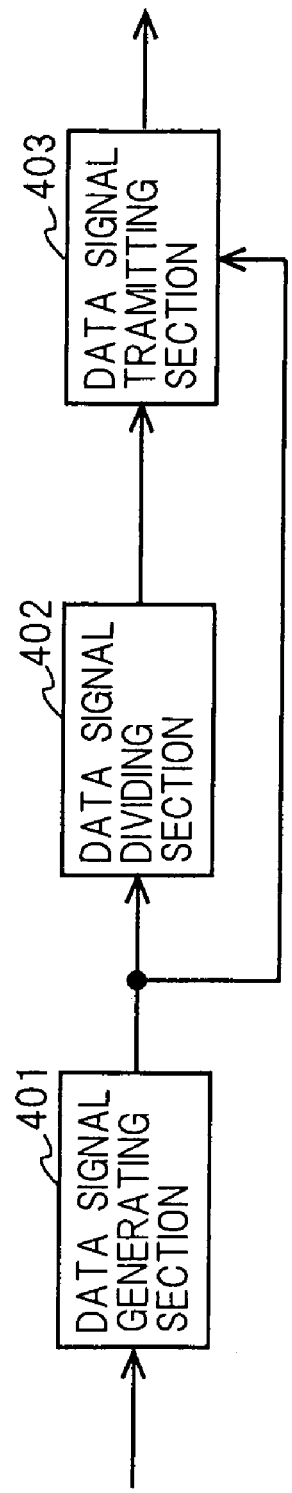
FIG. 4 is a block diagram showing generating blocks for a data signal in a transmission apparatus in accordance with Embodiment 1 of the present invention.
Figure 5:
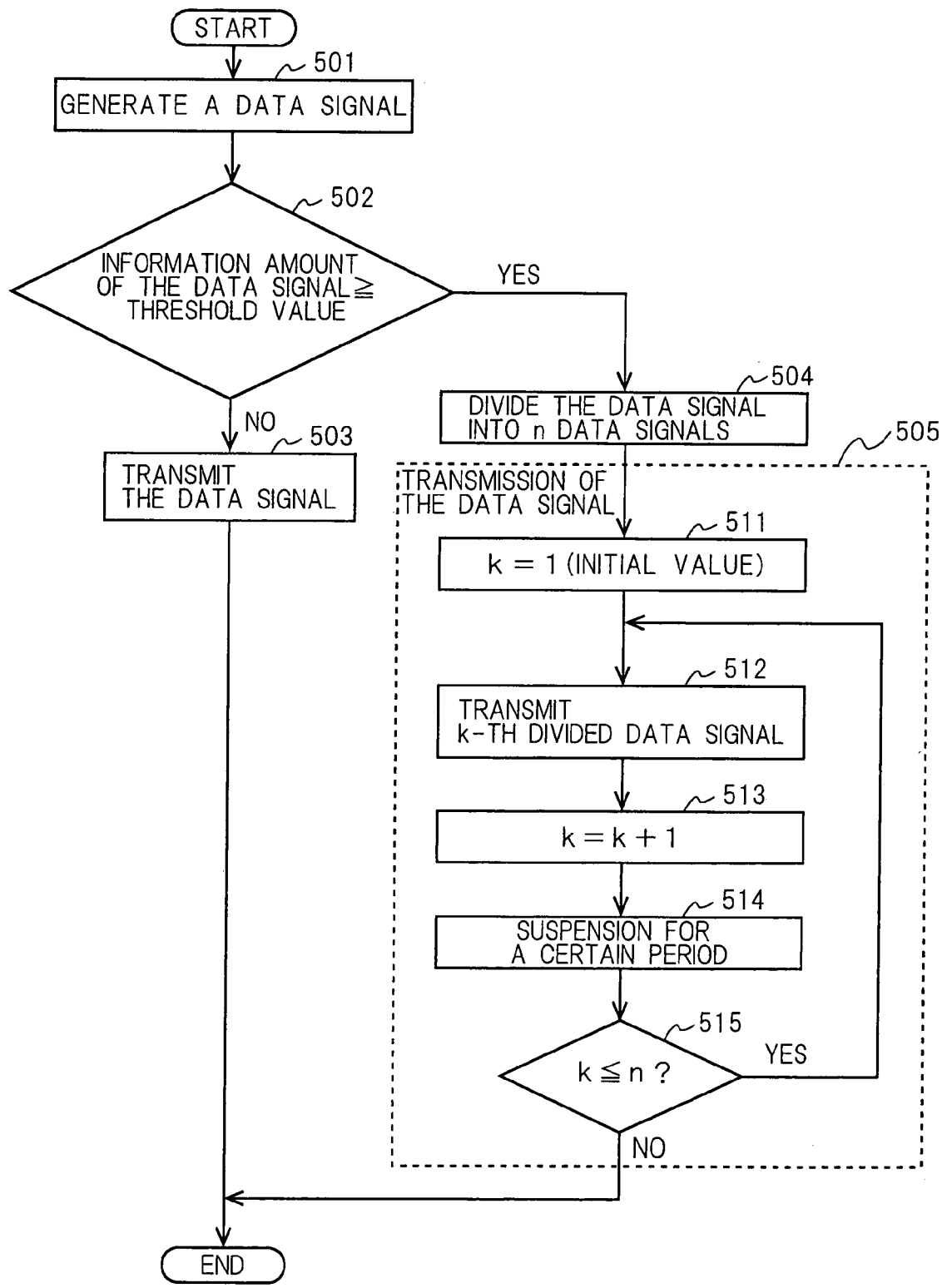
FIG. 5 is a flow chart showing a method for generating a data signal in accordance with Embodiment 1 of the present invention.

Referring to FIG. 4, FIG. 5 and part (c) of FIG. 6, the long data signal dividing function of the first transmission apparatus 101 and the second transmission apparatus 102 is described.

As illustrated in part (c) of FIG. 10, in the prior art transmission system, data signals in a chunk are transmitted without interruption and continuously from the beginning to the end regardless of the size of the information amounts. There is no data signal quiescent period while transmitting data signals. Accordingly, with the same configuration used for the prior art transmission system, it is impossible to transmit an interrupt signal during this period.

However, if the information amounts of the data signals are too large (if, for example, compressed video signals in a chunk are transmitted), there could be a case where the deadline for processing the signals has passed before completing the transmission of the data signals. This makes it impossible to ensure the stable communication between, for example, the external communication device and the transmission system (the first transmission apparatus and the second transmission apparatus).

For this reason, each of the first transmission apparatus 101 and the second transmission apparatus 102 has a data signal generating block shown in FIG. 4. FIG. 4 is a block diagram of the data signal generating block of the transmission apparatus in Embodiment 1.

In FIG. 4, the numeral 401 is a data signal generating section; the numeral 402 is a data signal dividing section; and the numeral 403 is a data signal transmitting section.

In the transmission apparatus of Embodiment 1, the CPU 111 and the control section 121 carrying out commands written on ROM have the functions of the data signal generating section 401, the data signal dividing section 402 and the data signal transmitting section 403.

The data signal generating section 401 generates a necessary data signal. If the information amount of the data signal generated by the data signal generating section 401 is less than a certain threshold value, the generated data signal is transmitted as it is to the data signal transmitting section 403. The data signal transmitting section 403 transmits the generated data signal to the first buffer memory 112 (or the second buffer memory 122). The first input/output section 113 (or the second input/output section 124) transmits the data signal stored in the first buffer memory 112 (or the second buffer memory 122). The data signal is transmitted as a continuous data string via the data lines 132.

If the information amount of the data signal generated by the data signal generating section 401 is equal to a certain threshold value or more, the data signal is transmitted to the data signal dividing section 402. The data signal dividing section 402 divides the inputted data signal to generate a plurality of divided data signals each having less than a certain amount of information. The data signal transmitting section 403 inputs a plurality of divided data signals outputted by the data signal dividing section 402 and transmits a plurality of divided data signals to the first buffer memory 112 (or the second buffer memory 122). And the data signal transmitting section 403 transmits the information about a plurality of divided data signals to the first input/output section 113 (or the second input/output section 124). The first input/output section 113 (or the second input/output section 124) transmits each of the divided data signals stored in the first buffer memory 112 (or the second buffer memory 122). Each of the divided data signals is transmitted via the data lines 132 as a continuous data string, and the quiescent period shown by the period 317 in part (b) of FIG. 3 is provided between one divided data signal and another divided data signal.

Part (c) of FIG. 6 shows a signal transmission in the case where the data signal dividing section 402 divides a data signal to generate a plurality of divided data signals. In the signal transmission shown in part (c) of FIG. 6, a data signal with a large amount of information is generated according to a command signal 621. The data signal with a large amount of information is divided by the data signal dividing section 402. After a response signal 622 is transmitted, a plurality of divided data signals 623 to 626 are transmitted while each of them provides a quiescent period 627 between them. The data signal quiescent period detecting section 125 (and 141) detects the data signal quiescent period 314 during the quiescent period 627 (see part (b) of FIG. 3); therefore, it becomes possible to transmit an interrupt signal during this period. Because the divided data signal has less than a certain amount of information, the interrupt signal can be surely transmitted within a certain period.

As a result of this, it is possible to prevent an interrupt processing from being too late.

FIG. 5 is a flow chart showing a data signal generating method of the first transmission apparatus 101 and the second transmission apparatus 102.

First, a data signal is generated by request (step 501). Then, it is checked whether the information amount of the generated data signal is equal to or more than a certain threshold value, or not (step 502). If the information amount of the generated data signal is equal to or more than a certain threshold value, go to step 504. If the information amount of the generated data signal is less than a certain threshold value, go to step 503.

At step 503, the generated data signal is transmitted continuously as it is. The process is ended.

At step 504, the generated data signal is divided into n data signals. Each of the divided data signals has less than a certain amount of information.

Then, the n divided data signals are transmitted at step 505. Step 505 comprises steps 511 to 515. Step 505 is described in detail.

First, the initial value is set at k=1 (step 511). Then, the kth divided data signal is transmitted (step 512). And then, k is incremented by 1 (set at k=k+1) (step 513).

Next, the transmission of data signals is suspended for a certain period ($T_2$) (step 514). Then, it is checked whether k≦n or not (step 515). If k≦n, go back to step 512 and repeat steps 512 to 515. If k≦n does not stand, the process is ended because the transmission of n divided data signals has been completed.

Embodiment 2

Figure 7:
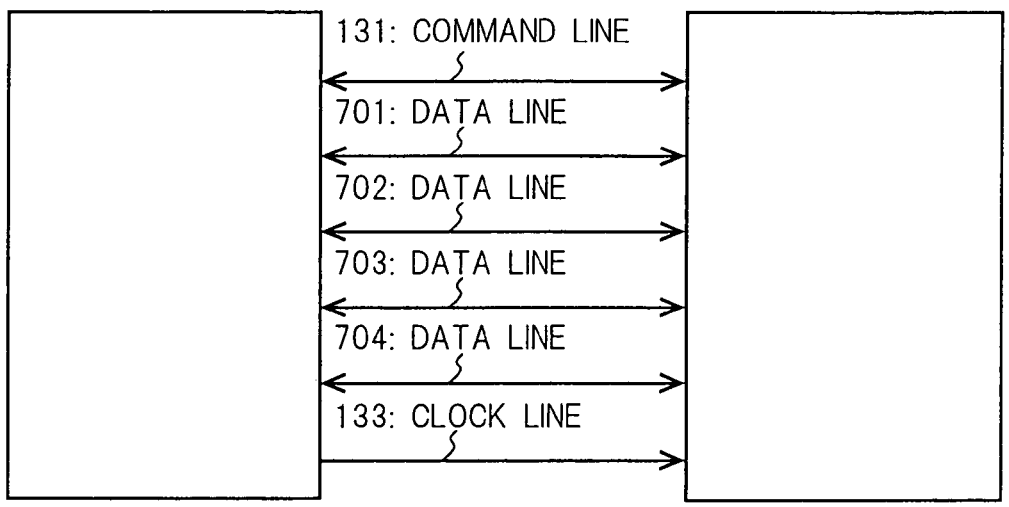
FIG. 7 is a diagram showing transmission modes of a transmission system in accordance with Embodiment 2 of the present invention.
Figure 7:
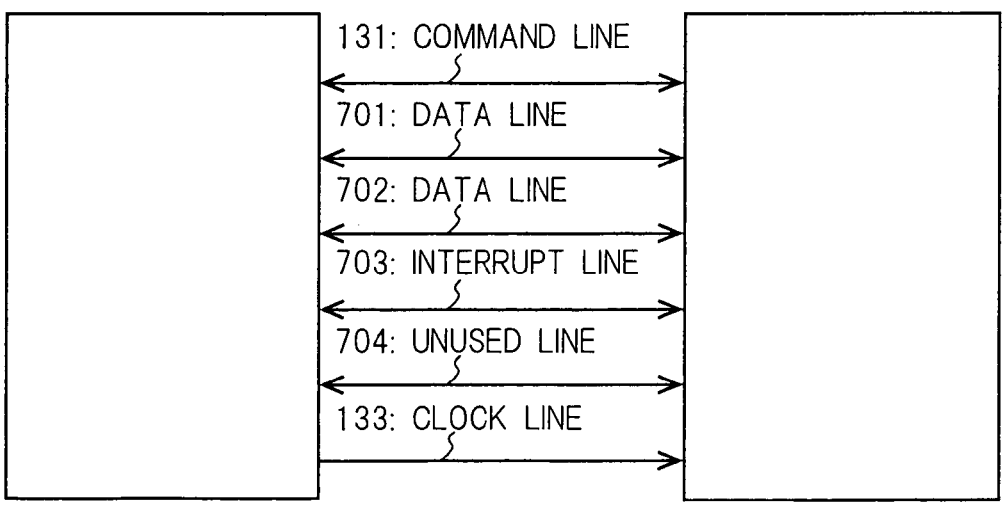
Figure 8:
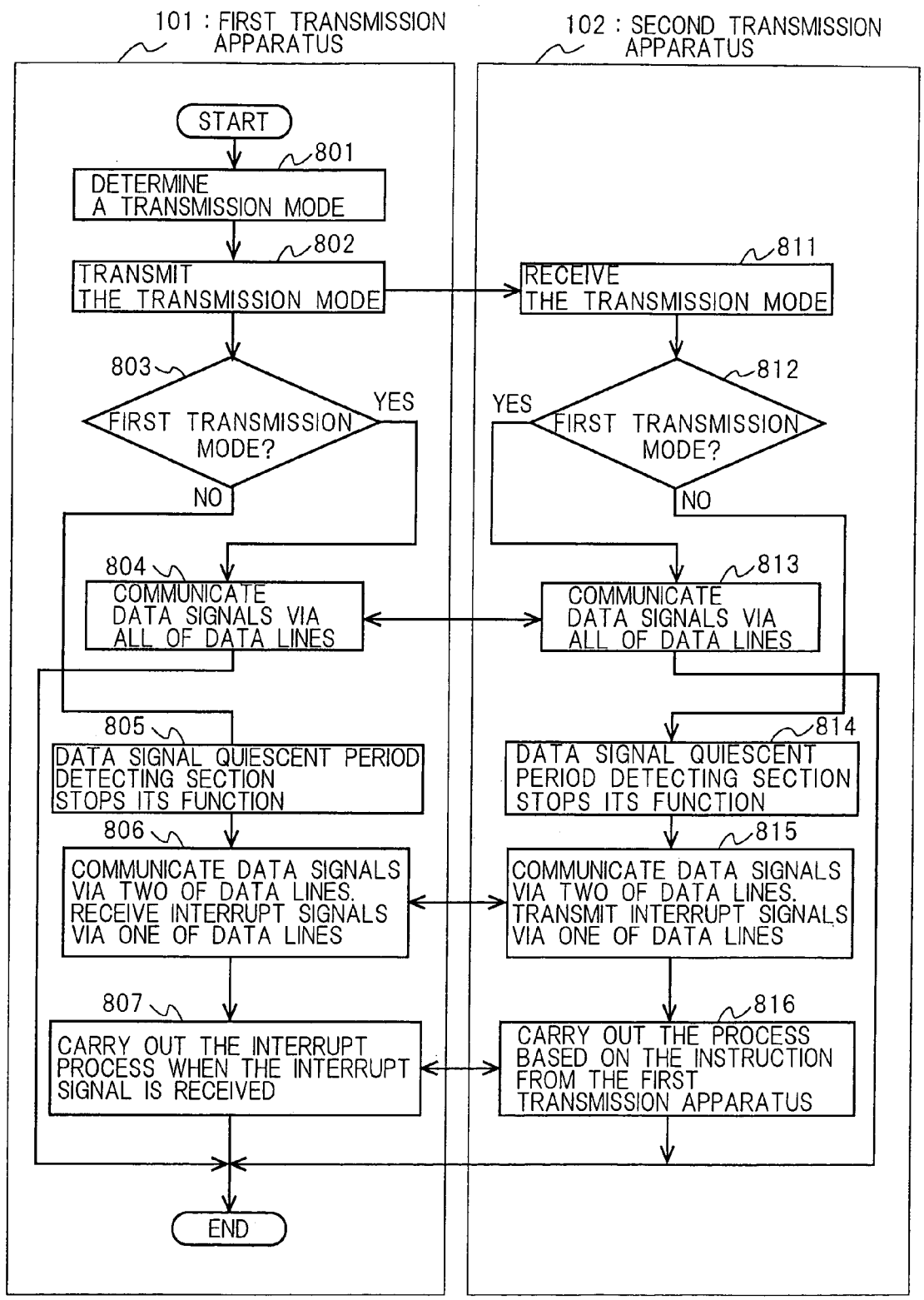
FIG. 8 is a flow chart showing a transmission method in accordance with Embodiment 2 of the present invention.
Figure 9:
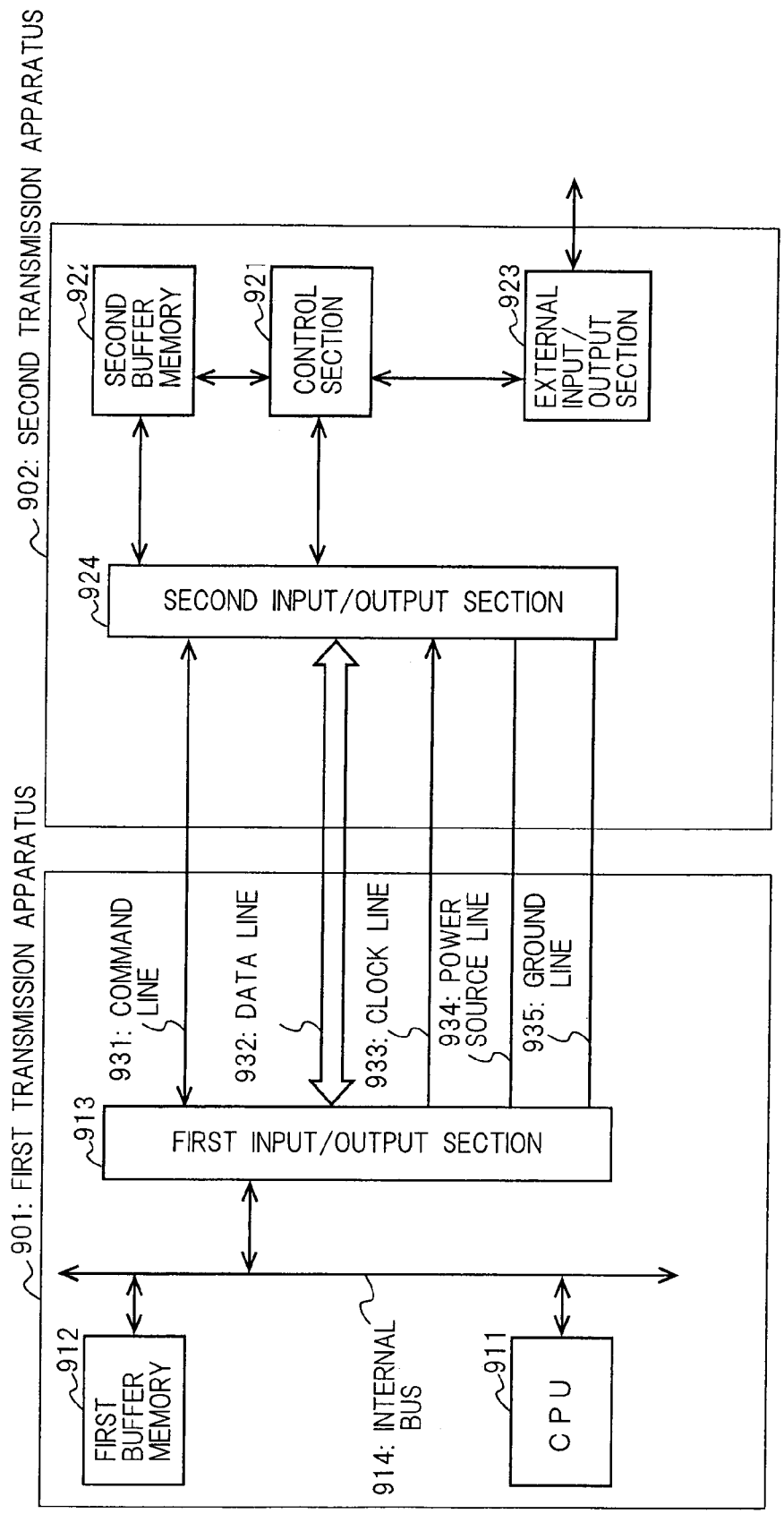
FIG. 9 is a block diagram of the prior art transmission system.

Referring to FIG. 7 and FIG. 8, the transmission system of Embodiment 2 in accordance with the present invention is described. The transmission system of Embodiment 2 has two transmission modes (a first transmission mode and a second transmission mode). Except for this point, the transmission system of Embodiment 2 has the same configuration as that of the transmission system of Embodiment 1 shown in FIG. 1.

In the transmission system of Embodiment 1, the first input/output section 113 and the second input/output section 124 always transmit data signals via four data lines.

The transmission system of Embodiment 2 has the first transmission mode in which the first input/output section 113 and the second input/output section 124 transmit data signals via four data lines (the same transmission method as that of the transmission system of Embodiment 1), and has the second transmission mode in which the first input/output section 113 and the second input/output section 124 transmit data signals via two data lines.

The CPU 111 selects either the first transmission mode or the second transmission mode and notifies the first input/output section 113 which transmission mode is selected. According to the selected transmission mode, the first input/output section 113 changes its internal connection.

Likewise, the control section 121 selects either the first transmission mode or the second transmission mode and notifies the second input/output section 124 which transmission mode is selected. According to the selected transmission mode, the second input/output section 124 changes its internal connection.

FIG. 7 is a diagram showing the transmission modes of the transmission system in Embodiment 2. Part (a) of FIG. 7 illustrates the first transmission mode; part (b) of FIG. 7 illustrates the second transmission mode.

The data lines (shown by the numeral 132 in FIG. 1) which connect the first transmission apparatus 101 with the second transmission apparatus 102 have different roles to play in the first transmission mode and in the second transmission mode, respectively. Parts (a) and (b) of FIG. 7 only illustrate the first transmission apparatus 101, the second transmission apparatus 102, the command line 131, the clock line 133 and four data lines 701 to 704 (shown by the numeral 132 in FIG. 1) showing the characteristics of each transmission mode.

In the first transmission mode shown in part (a) of FIG. 7, the first transmission apparatus 101 and the second transmission apparatus 102 transmit data signals by using all of the four data lines 701 to 704. The first transmission mode carries out the same transmission method as that of Embodiment 1.

In the first transmission mode, the four data lines 701 to 704 are basically for use in transmitting data signals. During a data signal quiescent period, an interrupt signal can be transmitted via the data line 701.

In the second transmission mode shown in part (b) of FIG. 7, the first transmission apparatus 101 and the second transmission apparatus 102 transmit data signals by using the two data lines 701 and 702 of the four data lines 701 to 704. The one data line 703 is used as an interrupt line. The interrupt line 703 is a dedicated line for transmitting an interrupt signal. The data line 704 is not used. At this moment, the data signal quiescent period detecting sections 125 and 141 stop their function.

The second transmission mode in which only two data lines are allowed to be used for transmitting data signals loses half its ability to transmit data between the first transmission apparatus and the second transmission apparatus, when compared with the first transmission mode in which four data lines can be used.

In the second transmission mode, however, an interrupt signal can be transmitted anytime via the interrupt line 703. The interrupt signal can be transmitted even when a data signal is being transmitted. Accordingly, it is possible to provide a transmission system having a high responsivity.

For example, the first transmission apparatus and the second transmission apparatus determine a transmission mode according to a command signal. To take another example, the first transmission apparatus and the second transmission apparatus determine a transmission mode according to the type of the second transmission apparatus (an optional equipment).

It is also possible for the second transmission apparatus to receive the information about the transmission mode determined by the first transmission apparatus and follow the transmission mode.

FIG. 8 is a flow chart showing the transmission method of Embodiment 2. In FIG. 8, the left side shows the process of the first transmission apparatus 101; the right side shows the process of the second transmission apparatus 102. First, the first transmission apparatus 101 determines a transmission mode (the first transmission mode or the second transmission mode).

Then, the first transmission apparatus 101 transmits the information about the determined transmission mode (step 802,). Then, the second transmission apparatus 102 receives the information about the determined transmission mode (step 811). The second transmission apparatus 102 is set at the same transmission mode as that of the first transmission apparatus. As a result of this, the first transmission apparatus 101 and the second transmission apparatus 102 are placed in the same transmission mode.

Next, it is checked whether or not the first transmission apparatus 101 is in the first transmission mode (step 803). If it is in the first transmission mode, go to step 804. If it is not in the first transmission mode (if it is in the second transmission mode), go to step 805.

At step 804, the first transmission apparatus transmits or receives data signals via all of the data lines if it is in the first transmission mode.

Likewise, it is checked whether or not the second transmission apparatus 102 is in the first transmission mode (step 812). If it is in the first transmission mode, go to step 813. If it is not in the first transmission mode (if it is in the second transmission mode), go to step 814.

At step 813, the second transmission apparatus transmits or receives data signals via all of the data lines if it is in the first transmission mode.

The interrupt processing method in the first transmission mode is the same as that of Embodiment 1.

In the first transmission apparatus, if it is in the second transmission mode (not in the first transmission mode), the data signal quiescent period detecting section 141 stops its function at step 805. As a result of this, the interrupt signal detecting section 114 can detect the signal transmitted via the after-mentioned interrupt line as an interrupt signal whenever it is transmitted. The interrupt signal detecting section 114 may not receive a signal indicating a data signal quiescent period while the data signal quiescent period detecting section 141 remains functioning.

Then, at step 806, data signals are transmitted or received via two of the data lines. One of the data lines is used as the interrupt line; an interrupt signal is received via the interrupt line.

After receiving the interrupt signal, the first transmission apparatus carries out the interrupt process at step 807.

Likewise, the second transmission apparatus, if it is in the second transmission mode (not in the first transmission mode), stops the function of the data signal quiescent period detecting section 125 at step 814. As a result of this, the interrupt signal generating section 126 can transmit an interrupt signal anytime via the second input/output section 124 and the interrupt line.

Then, at step 815, data signals are transmitted or received via two of the data lines. One of the data lines is used as the interrupt line; an interrupt signal is transmitted via the interrupt line.

After receiving the instruction outputted by the first transmission apparatus according to the interrupt signal, the second transmission apparatus carries out the process based on the instruction from the first transmission apparatus at step 816. The process is ended.

Thus, if for example the external communication device requires the external input signal 123 in the second transmission apparatus to carry out signal processing, the second transmission apparatus immediately transmits an interrupt signal to the first transmission apparatus. The interrupt signal can be transmitted even when a data signal is being transmitted.

The transmission system of Embodiment 2 has the first transmission mode and the second transmission mode; however, it is possible to have more transmission modes.

In the transmission apparatus and the transmission method of Embodiments, synchronous data transmission is carried out; however, the present invention is not limited to this. The present invention is also applicable for asynchronous data transmission.

In Embodiments, the transmission system having a digital signal processing unit and an optional equipment thereof is shown as an example; however, the present invention is not limited to this example. For instance, the present invention is also applicable for mutual communication between two digital signal processing units.

According to the present invention, it is possible to obtain the advantageous effect of being able to provide a transmission system and a transmission method (having a high responsivity) capable of transmitting an interrupt signal with a small number of input/output terminals (without a dedicated line for interrupt signals). As a result of this, it is possible to provide a small-sized and low-cost transmission apparatus in comparison with a transmission apparatus having a dedicated line for interrupt signals.

According to the present invention, it is possible to obtain the advantageous effect of being able to provide a transmission system and a transmission method (having a high responsivity) complying with the standard (the standard for IC cards described in this description, for example) where no dedicated line for interrupt signals is provided (without loss of compatibility) and capable of transmitting an interrupt signal.

Accordingly, it is possible to provide a master/slave type transmission system and transmission method having a high responsivity through the use of interrupt signals.

According to the present invention, it is possible to obtain the advantageous effect of being able to provide a high-speed transmission apparatus, transmission system and transmission method operating at a high operating frequency by providing a period just after a data signal and just before the following data signal where neither data signal nor interrupt signal is transmitted and by switching between an interrupt signal and a data signal during the period.

According to the present invention, it is possible to obtain the advantageous effect of being able to provide a transmission apparatus and a transmission method (having a high responsivity) having a protocol where a data signal is transmitted after the transmission of a command signal (the standard for IC cards, for example) and transmitting an interrupt signal via a data line during the period which occurs on the basis of the protocol and where data signals are not transmitted.

According to the present invention, it is possible to obtain the advantageous effect of being able to provide a transmission apparatus and a transmission method (having a high responsivity) capable of transmitting an interrupt signal without interrupting the transmission of normal data signals by transmitting the interrupt signal through the use of a data signal transmission disabled period provided after the completion of transmitting a data signal, and complying with a communication protocol.

According to the present invention, it is possible to obtain the advantageous effect of being able to provide a transmission apparatus and a transmission method reliably transmitting a data signal and an interrupt signal.

According to the present invention, it is possible to obtain the advantageous effect of being able to provide a transmission apparatus and a transmission method capable of transmitting an interrupt signal reliably within a certain period even when the information amount of a data signal to be transmitted is large.

According to the present invention, it is possible to obtain the advantageous effect of being able to provide a transmission system and a transmission method capable of transmitting an interrupt signal anytime by choosing the second transmission mode, and having a high responsivity.

Although the present invention has been described in detail to some extent in terms of the preferred embodiments, it is to be understood that such disclosure could have any change in the configurative details. Accordingly, various combinations of each element and the change of their order are to be achieved without departing from the scope and true spirit of the claimed invention.

INDUSTRIAL APPLICABILITY

As described above, the transmission apparatus and the transmission method in accordance with the present invention are useful for various types of apparatuses and methods for transmitting digital signals.

What is claimed is:

1. A first transmission apparatus provided in association with a second transmission apparatus, said first transmission apparatus receiving an interrupt signal from said second transmission apparatus, sending a command signal to said second transmission apparatus to allow data signal transmission from said second transmission apparatus to said first transmission apparatus, and receiving a data signal from said second transmission apparatus, said first transmission apparatus comprising:

- an input/output section having a command line and a data line which are configured for being connected to said second transmission apparatus, said command line sending a command signal from said first transmission apparatus to said second transmission apparatus, and said data line sending a data signal to or from said second transmission apparatus in response to said command signal;
- a data signal quiescent period detecting section, coupled to said input/out section, to detect signals along said command line and said data line, to detect whether or not said command signal transmitted along said command line is to permit transfer of a data signal, and to detect a data signal quiescent period which is any predetermined portion within a period from the end of a data signal transmitted in response to said command signal on said command line until the end of a next command signal to transfer a data signal on said data line;
- an interrupt signal detecting section, coupled to said input/output section, to detect an interrupt signal transmitted on the data line from the second transmission apparatus to said first transmission apparatus during said data signal quiescent period; and
- a CPU, coupled to said input/output section and said interrupt signal detecting section, to initiate an interrupt process in response to said interrupt signal.

2. A first transmission apparatus provided in association with a second transmission apparatus, said first transmission apparatus receiving an interrupt signal from said second transmission apparatus, sending a command signal to said second transmission apparatus to allow data signal transmission from said second transmission apparatus to said first transmission apparatus, and receiving a data signal from said second transmission apparatus, said second transmission apparatus comprising:

- an input/output section having a command line and a data line which are configured for being connected to said first transmission apparatus, said command line receiving a command signal from said first transmission apparatus, and said data line sending a data signal to or from said first transmission apparatus in response to said command signal;
- a data signal quiescent period detecting section, coupled to said input/output section, to detect signals along said command line and said data line, to detect whether or not said command signal transmitted along said command line is to permit transfer of a data signal, and to detect a data signal quiescent period which is any predetermined portion within a period from the end of a data signal transmitted in response to said command signal on said command line until the end of a next command signal to transfer a data signal on said data line; and
- an interrupt signal generating section, coupled to said input/output section, to generate an interrupt signal to be transmitted on the data line from the second transmission apparatus to said first transmission apparatus during said data signal quiescent period.

3. A data transmission system having a first transmission apparatus provided in association with a second transmission apparatus, said first transmission apparatus receiving an interrupt signal from said second transmission apparatus, sending a command signal to said second transmission apparatus to allow data signal transmission from said second transmission apparatus to said first transmission apparatus, and receiving a data signal from said second transmission apparatus, said data transmission system comprising:

said first transmission apparatus comprising:

- an input/output section having a command line and a data line which are configured for being connected to said second transmission apparatus, said command line sending a command signal from said first transmission apparatus to said second transmission apparatus, and said data line sending a data signal to or from said second transmission apparatus is response to said command signal;
- a data signal quiescent period detecting section, coupled to said input/output section, to detect signals along said command line and said data line, to detect whether or not said command signal transmitted along said command line is to permit transfer of a data signal, and to detect a data signal quiescent period which is any predetermined portion within a period from the end of a data signal transmitted in response to said command signal to the end of a next command signal on said command line to transfer a data signal on said data line;
- an interrupt signal detecting section, coupled to said input/output section, to detect an interrupt signal transmitted on the data line from the second transmission apparatus to said first transmission apparatus during said data signal quiescent period; and
- a CPU, coupled to said input/output section and said interrupt signal detecting section, to initiate an interrupt process in response to said interrupt signal; and said second transmission apparatus comprising:

- an input/output section having a command line and a data line which are configured for being connected to said first transmission apparatus, said command line receiving said command signal from said first transmission apparatus, and said data line sending said data signal to or from said first transmission apparatus in response to a command signal;
- a data signal quiescent period detecting section, coupled to said input/output section, to monitor signals along said command line and said data line, to detect whether or not said command signal transmitted along said command line is to permit transfer of a data signal, and to detect a data signal quiescent period which is any predetermined portion within a period from the end of a data signal transmitted in response to said command signal on said command line until the end of a next command signal to transfer a data signal on said data line; and
- an interrupt signal generating section, coupled to said input/output section, to generate an interrupt signal to be transmitted on the data line from the second transmission apparatus to said first transmission apparatus during said data signal quiescent period.

4. The first transmission apparatus according to claim 1, wherein said interrupt signal permits transmitting a data signal from said second transmission apparatus to said first transmission apparatus.

5. The second transmission apparatus according to claim 2, wherein said interrupt signal permits transmitting a data signal from said second transmission apparatus to said first transmission apparatus.

6. The data transmission system according to claim 3, wherein said interrupt signal permits transmitting a data signal from said second transmission apparatus to said first transmission apparatus.

* * * * *